(12) United States Patent
Kai et al.

(10) Patent No.: US 9,774,218 B2
(45) Date of Patent: Sep. 26, 2017

(54) NON-CONTACT POWER FEEDING APPARATUS

(71) Applicant: NISSAN MOTOR CO., LTD., Yokohama-shi, Kanagawa (JP)

(72) Inventors: Toshihiro Kai, Kanagawa (JP); Kraisorn Throngnumchai, Kanagawa (JP); Yuji Naruse, Kanagawa (JP); Yuuya Yamauchi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/310,931

(22) PCT Filed: May 15, 2014

(86) PCT No.: PCT/JP2014/062923
§ 371 (c)(1),
(2) Date: Nov. 14, 2016

(87) PCT Pub. No.: WO2015/173923
PCT Pub. Date: Nov. 19, 2015

(65) Prior Publication Data
US 2017/0093223 A1 Mar. 30, 2017

(51) Int. Cl.
*H01F 37/00* (2006.01)
*H01F 38/00* (2006.01)
(Continued)

(52) U.S. Cl.
CPC ............ *H02J 50/12* (2016.02); *B60L 11/182* (2013.01); *H02J 7/025* (2013.01); *H02J 50/90* (2016.02)

(58) Field of Classification Search
CPC ......... B60L 11/182; H02J 17/00; H02J 50/12; H02J 50/90; H02J 7/025
(Continued)

(56) References Cited

U.S. PATENT DOCUMENTS 7,450,910 B2  11/2008  Aoki
9,457,676 B2  10/2016  Abe et al.
(Continued)

FOREIGN PATENT DOCUMENTS

CN  1604437 A  9/2010
JP  9-65502 A  3/1997
(Continued)

*Primary Examiner* — Rexford Barnie
*Assistant Examiner* — Toan Vu
(74) *Attorney, Agent, or Firm* — Foley & Lardner LLP

(57) ABSTRACT

A non-contact power feeding apparatus including a power transmitting coil 5 receiving supply of electric power from an AC power supply, a power receiving coil 6 receiving electric power transmitted from the power transmitting coil 5 in a non-contacting manner, switching unit for switching connections with coils 61 to 63, output unit for outputting the electric power received from the power receiving coil 6 to a load 11 through the switching unit, and controller for controlling the switching unit. The power receiving coil 6 includes a plurality of coils 61 to 63 sharing their coil axes, the switching unit is connected to the coils 61 to 63 and switches polarity of the coils 61 to 63 in accordance with interlinkage magnetic flux passes through each of the coils 61 to 63.

5 Claims, 22 Drawing Sheets

(51) Int. Cl.
*H02J 50/12* (2016.01)
*H02J 7/02* (2016.01)
*B60L 11/18* (2006.01)
*H02J 50/90* (2016.01)

(58) Field of Classification Search
USPC .......................................................... 307/104
See application file for complete search history.

(56) References Cited

U.S. PATENT DOCUMENTS

2005/0068009 A1    3/2005  Aoki
2013/0038282 A1*  2/2013  Shimokawa ............ H01F 38/14
                                                       320/108
2013/0313912 A1  11/2013  Abe et al.
2014/0125286 A1   5/2014  Cho et al.

FOREIGN PATENT DOCUMENTS

| | | | |
|---|---|---|---|
| JP | 2008-087733 | A | 4/2008 |
| JP | 2010-220284 | A | 9/2010 |
| JP | 2010-226889 | A | 10/2010 |
| JP | 2010226889 | * | 10/2010 |
| JP | 2011-050127 | A | 3/2011 |
| JP | 2012-170195 | A | 9/2012 |
| JP | 2013-5591 | A | 1/2013 |
| JP | 2013-013318 | A | 1/2013 |
| JP | 5347619 | B2 | 11/2013 |
| KR | 10-2012-0135519 | A | 12/2012 |
| WO | WO 2011/135722 | A1 | 11/2011 |

\* cited by examiner

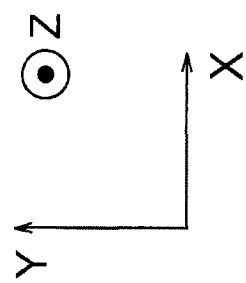
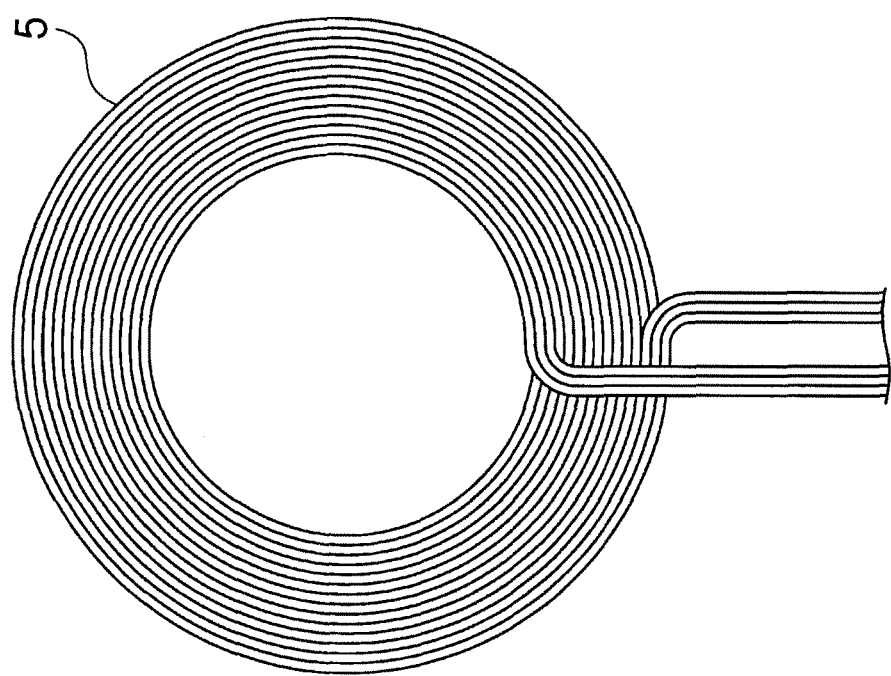
FIG.2B

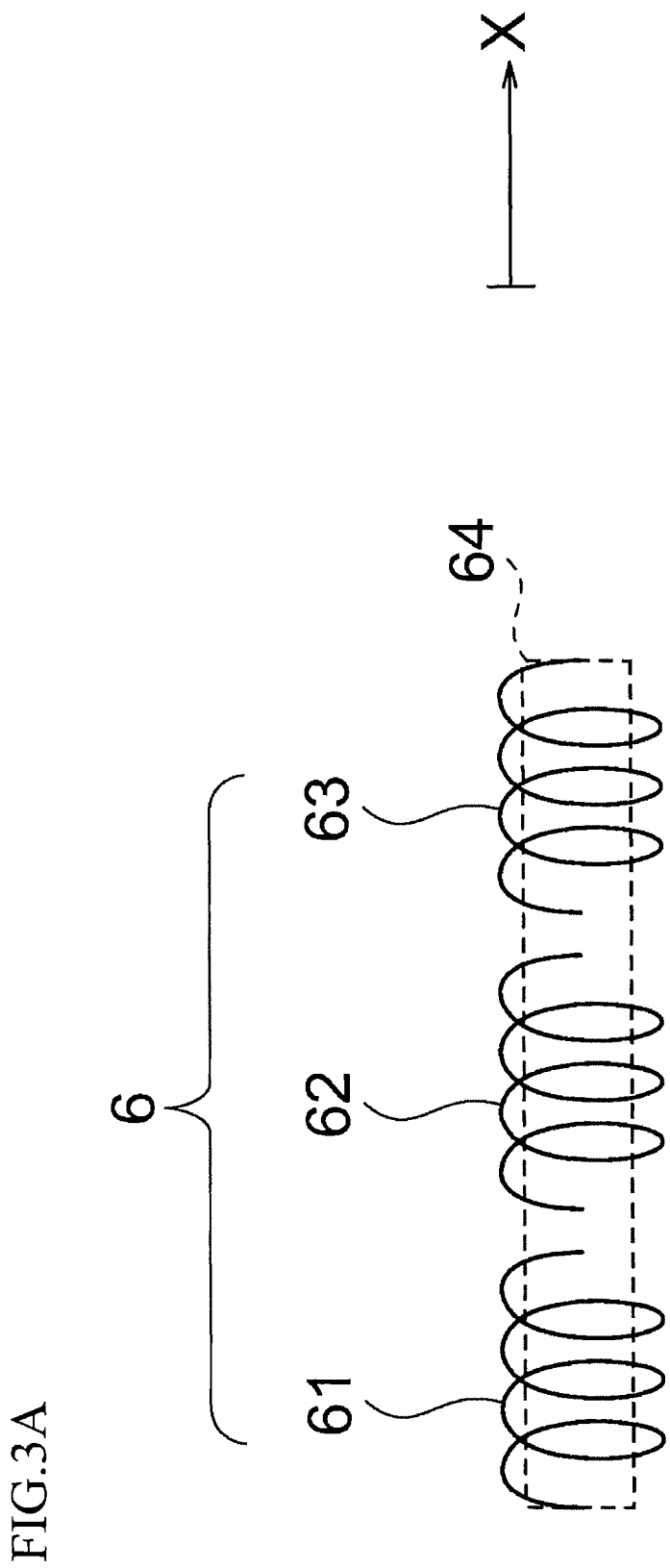

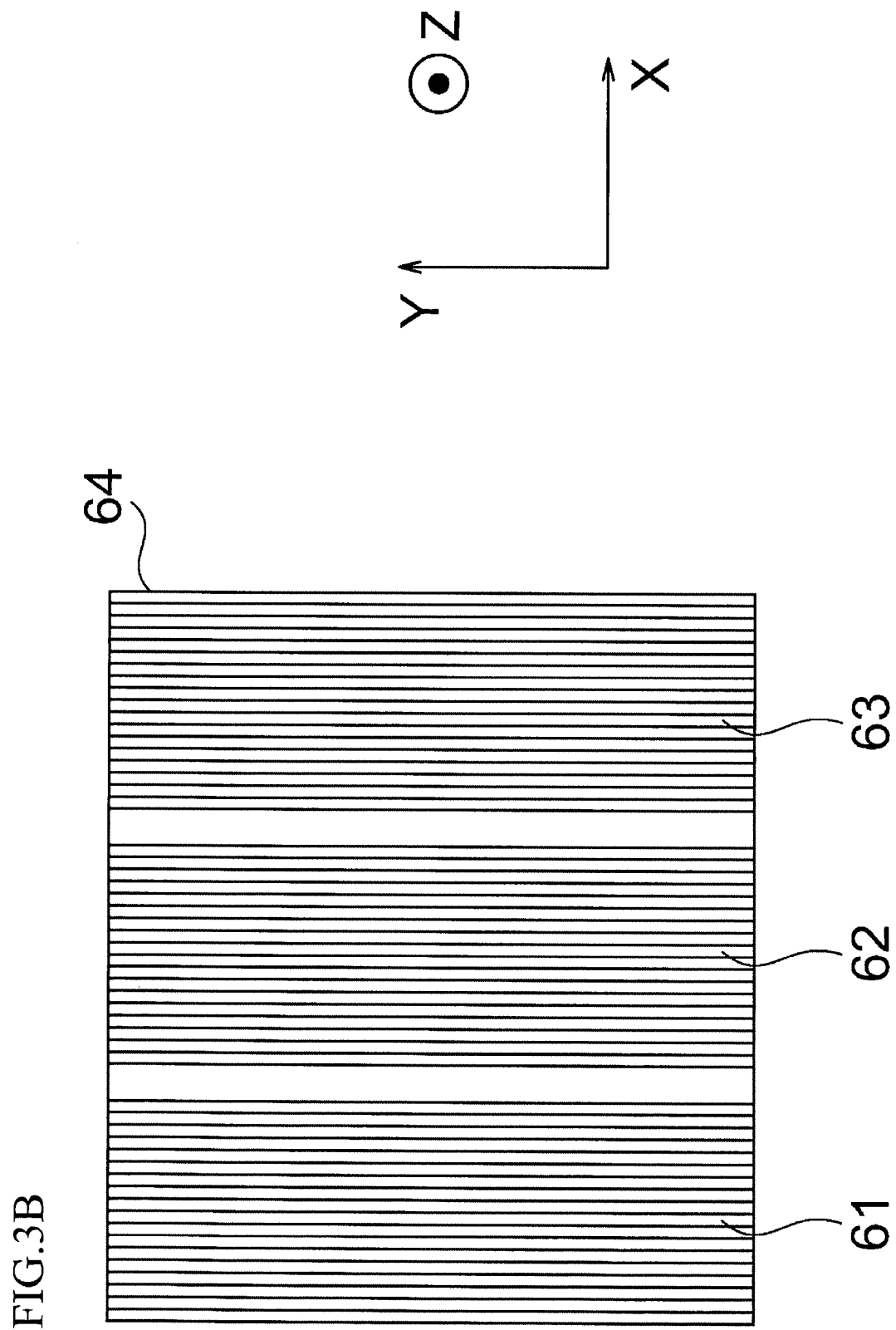

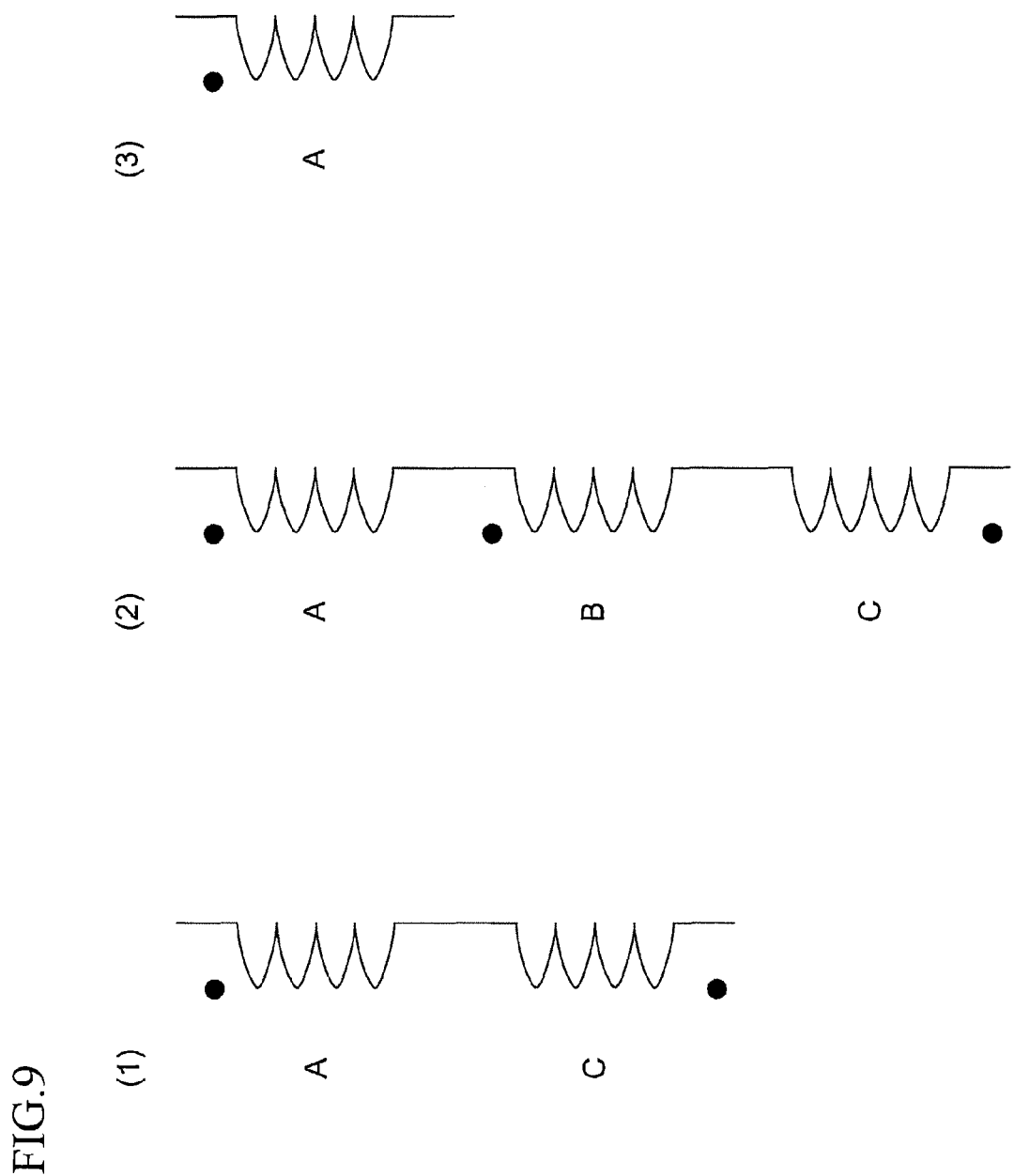

NON-CONTACT POWER FEEDING APPARATUS

TECHNICAL FIELD

The present invention relates to a non-contact power feeding apparatus.

BACKGROUND ART

There has been disclosed a non-contact power feeding apparatus including a flat-plate type primary-side core wound with a primary-side coil and a flat-plate type secondary-side core wound with a secondary-side core, that performs non-contact power feeding from the primary-side coil to the secondary-side core in a state in which the primary-side core and secondary-side core are faced each other with a space interposed therebetween (Patent Document 1).

PRIOR ART DOCUMENT

Patent Document

[Patent Document 1] JP 2011-50127 A

SUMMARY OF INVENTION

Problems to be Solved by Invention

However, when a coil of the secondary side is the above-mentioned secondary-side coil and a coil of the primary side is a loop-shaped coil, which is formed by winding a coil wire along the face facing the plate face of the secondary-side core, in the non-contact power feeding apparatus, when the primary-side coil and secondary-side coil are faced each other, the direction of a interlinkage magnetic flux that passes through the secondary-side coil is reversed with a boundary at a center point of the secondary-side coil, and the voltage received at the both ends is mutually canceled. As a result, reception voltage at the secondary-side coil becomes zero, and thus there is a problem in that the secondary-side coil cannot receive electric power.

An object of the present invention is to provide a non-contact power feeding apparatus improved in reception voltage of the power receiving coil.

Means for Solving Problems

The present invention includes a power receiving coil including a plurality of coils sharing their coil axes and a switching unit connected to the coils and for switching the connection with the coils. With the switching unit, the present invention achieves the above objection by switching polarity of the coils in accordance with interlinkage magnetic flux that passes through each of the coils.

Effect of the Invention

The present invention can improve reception voltage as the reception voltage of the power receiving coil is added in accordance with the interlinkage magnetic flux that passes through the power receiving coil by switching polarity of the coils included in the power receiving coil.

BRIEF DESCRIPTION OF DRAWINGS

FIG. 2B is a plan view of the power transmitting coil for explaining the power transmitting coil in FIG. 1.

FIG. 3A is a diagram conceptually illustrating a structure of the power receiving coil for explaining a power receiving coil in FIG. 1.

FIG. 3B is a plan view of the power receiving coil for explaining a power receiving coil in FIG. 1.

FIG. 9 is conceptual diagrams for explaining polarity of a plurality of coils on the power-receiving side in FIG. 1 and connection between the coils.

MODES FOR CARRYING OUT THE INVENTION

Hereinafter, an embodiment of the present invention will be described with reference to the drawings.

First Embodiment

Figure 1:
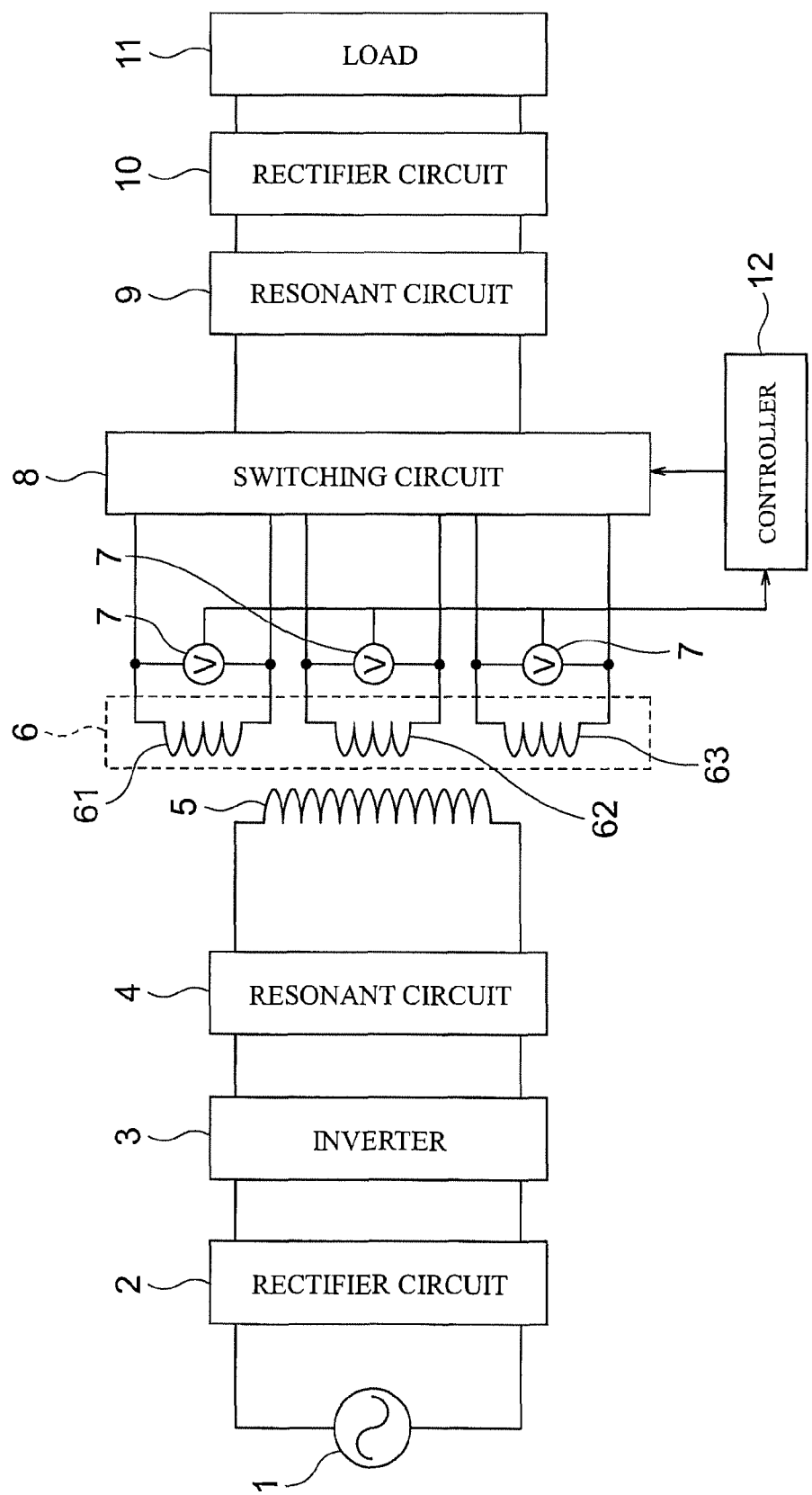
FIG. 1 is a block diagram of a non-contact power feeding apparatus according to an embodiment of the present invention.

FIG. 1 is a block diagram of a non-contact power feeding apparatus according to an embodiment. The non-contact power feeding apparatus of the embodiment is, for example, an apparatus for supplying non-contact electric power from the ground side to a battery of a vehicle when charging a battery of the vehicle such as an electric vehicle. The non-contact power feeding apparatus according to the present embodiment is applicable not only on a charging system of a vehicle battery but also on other systems.

The non-contact power feeding apparatus includes an AC power supply 1, a rectifier circuit 2, an inverter 3, a resonant circuit 4, a power transmitting coil 5, a power receiving coil 6, a voltage sensor 7, a switching circuit 8, a resonant circuit 9, a rectifier circuit 10, a load 11, and a controller 12. In FIG. 1, the AC power supply 1 and load 11 are shown as part of the configuration of the non-contact power feeding apparatus for convenience.

The AC power supply 1 is a power supply to output AC power of a commercial frequency (for example, 50 Hz or 60 Hz). The rectifier circuit 2 is a circuit to rectify the AC, which is output from the AC power supply 1, to a DC. The rectifier circuit 2 is connected between the AC power supply 1 and the inverter 3.

The inverter 3 includes a conversion circuit connecting a plurality of switching elements such as IGBT in a bridge form. The inverter 3 converts DC power, which is an output from the rectifier circuit 2, into a high-frequency (for example, about several kHz to several hundred Hz) AC power, and outputs the converted electric power to the resonant circuit 4.

The resonant circuit 4 is a circuit for resonating the AC power on the transmitting side together with the power transmitting coil 5. The resonant circuit 4 includes a capacity connected in series or in parallel with relative to power transmitting coil 5. The resonant circuit 4 is also a circuit for setting the output electric power of the inverter 3 by adjusting the amplitude and phase of the AC voltage or AC current output from the inverter 3. The resonant circuit 4 is connected between the inverter 3 and power transmitting coil 5.

The power transmitting coil 5 is a coil that receives supply of the electric power from the AC power supply 1 through the rectifier circuit 2 or the like, and the power transmitting coil 5 is also a coil for transmitting the electric power supplied from the AC power supply 1 to the power receiving coil 6.

The power receiving coil 6 is a coil for receiving the electric power transmitted from the power transmitting coil in a non-contacting manner. The power receiving coil 6 includes a plurality of coils 61 to 63 sharing their coil axes. When the power receiving coil 6 is faced with the power transmitting coil 5, a space is formed between the power transmitting coil 5 and power receiving coil 6.

Figure 2A:
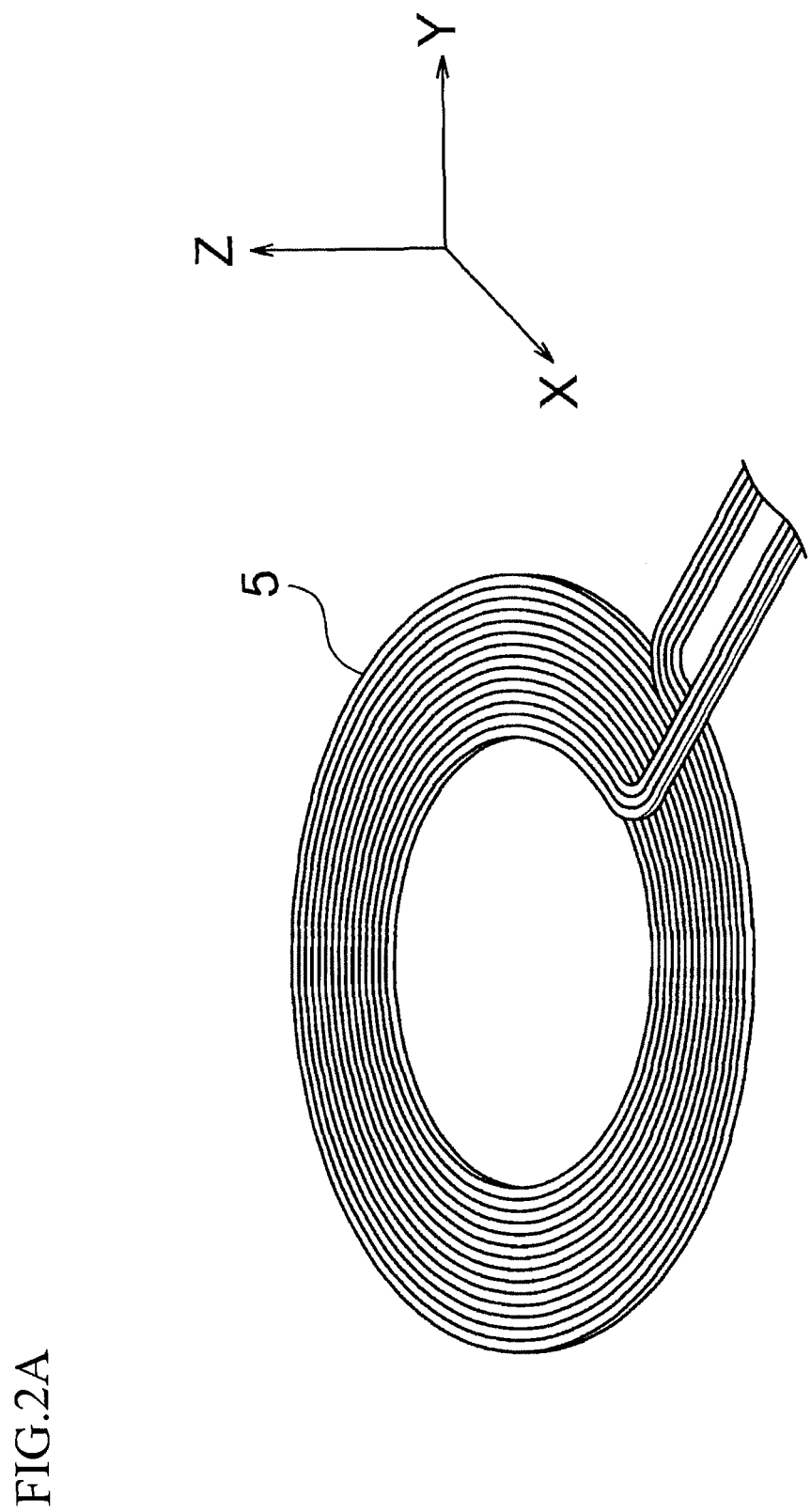
FIG. 2A is a perspective view of the power transmitting coil for explaining the power transmitting coil in FIG. 1.

In the following, configurations of the power transmitting coil 5 and power receiving coil 6 are explained using FIG. 2 and FIG. 3. FIG. 2A is a perspective view of the power transmitting coil 5 and FIG. 2B is a plan view of the power transmitting coil 5.

The power transmitting coil 5 is formed by repeatedly winding a wire to be wound in a spiral manner on the same plane surface. The surface that runs along the loop formed by the wound wire is the coil surface (wound wire surface) of the power transmitting coil 5. More, when the configuration of the power-transmitting side (primary side) of the non-contact power feeding apparatus is arranged on the ground, the power transmitting coil 5 is arranged on the ground and the coil surface of the power transmitting coil 5 is arranged so as to follow along the ground surface (XY plane). Further, the direction of the coil axis of the power transmitting coil 5 is the direction perpendicular to the ground surface plane (Z-direction). Hereinafter, the coil shape as shown in FIG. 2A and FIG. 2B may be also called as a disk type.

FIG. 3A is diagrams conceptually illustrating the structure of the power receiving coil 6. FIG. 3B is a plan view of the power receiving coil 6. The power receiving coil 6 includes a plurality of independent coils 61 to 63. The coils 61 to 63 are formed by dividing one solenoid-type coil into three. The coil 61 is formed by repeatedly winding a wire to be wound around the sides of a core 64 that has a rectangular parallelepiped shape. Like the coil 61, the coils 62 and 63 are also formed by repeatedly winding the wire to be wound to the core 64. The directions for winding the wire to be wound in the coils 61 to 63 are the same. Further, the coil 61 and coil 63 are disposed to the ends of the core 64 respectively, and the coil 62 is disposed between the coil 61 and coil 63.

The two terminals that correspond to the end parts of the coil 62 are not connected with the connection terminals of the coil 61 and coil 63. Also, the terminals of the coils 62 and 63 are not directly connected with the terminals of other coils 61 to 63. More, the coils 61 to 63 share the coil axis with each other. The coil axis of the coil 61, the coil axis of the coil 62, and the coil axis of the coil 63 are aligned on the same line. The coil surfaces of the coils 61 to 63 are aligned so as to become parallel to each other on different planes.

When the configuration of the power-receiving side (secondary side) of the non-contact power feeding apparatus is to be arranged on a vehicle, the power receiving coil 6 is arranged on the vehicle in a way in which the direction of the coil axes of the coils 61 to 63 becomes the travel direction of the vehicle. Hereinafter, the coil shape as shown in FIG. 3 is also collectively called as a solenoid type. Further, in FIG. 3, the power receiving coil 6 of the solenoid type is formed from three coils 61 to 63. However, a single coil formed by helically winding a wire to be wound to a core is also collectively called as a solenoid-type coil.

Back to FIG. 1, the voltage sensor 7 is a sensor for detecting voltage induced in each of the coils 61 to 63 included in the power receiving coil 6. The voltage sensor 7 is connected between connection terminals of each of the coils 61 to 63. The switching circuit 8 is a circuit for switching connection in each of the coils 61 to 63 and the switching circuit 8 is connected between the power receiving coil 6 and resonant circuit 9. The switching circuit 8 is connected to each of the coils 61 to 63. More, the switching circuit 8 switches the polarity in each of the coils 61 to 63 in accordance with interlinkage magnetic flux that passes through each of the coils 61 to 63. The interlinkage magnetic flux is a magnetic flux generated by the power transmitting coil 5 when power is transmitted from the power transmitting coil 5 to power receiving coil 6. Further, detailed configurations of the polarity of the coils 61 to 63 and switching circuit 8 are described later.

The resonant circuit 9 is a circuit for resonating the AC power on the power-receiving side together with the power receiving coil 6. The resonant circuit 9 includes a capacity connected in series or parallel relative to the power receiving coil 6. The resonant circuit 9 is also a circuit for setting the output electric power, which is output to the rectifier circuit 10, by adjusting the amplitude and phase of the AC voltage or the amplitude and phase of AC current received from the power receiving coil 6. The resonant circuit 9 is connected between the switching circuit 8 and rectifier circuit 10.

The rectifier circuit 10 is a circuit for rectifying the AC power output from the resonant circuit 9 to a direct current. The resonant circuit 9 and rectifier circuit 10 are the circuits for outputting the electric power received by the power receiving coil 6 to a load through the switching circuit 8. The load 11 is a battery charged by the electric power output from the rectifier circuit 10. More, the load 11 is not limited to a battery and may be a motor for example.

Figure 4:
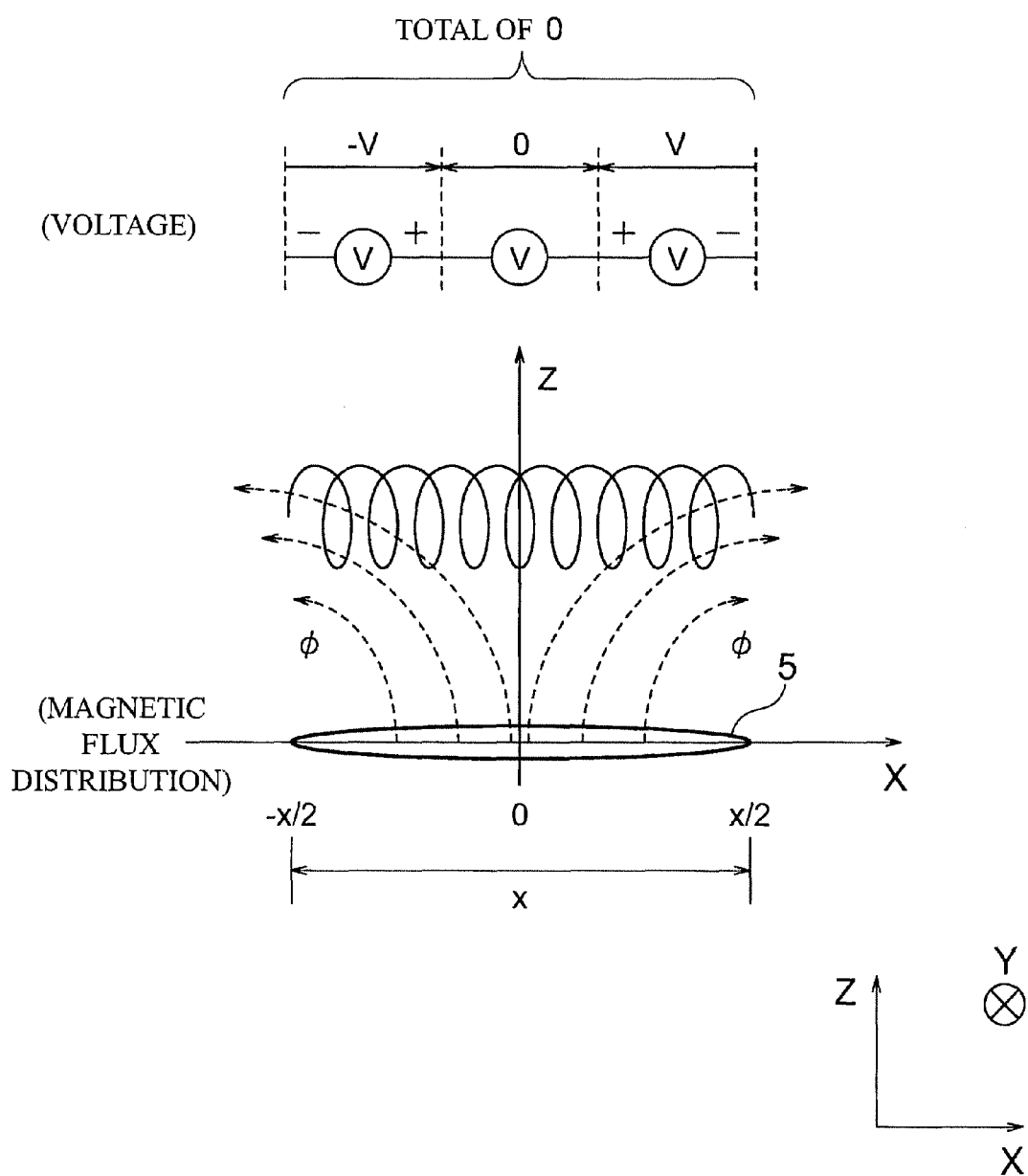
FIG. 4 is conceptual diagrams for explaining a magnetic flux distribution (4) and reception voltage between coils of a non-contact power feeding apparatus according to a comparative example.

Now, the voltage (reception voltage) of the power-receiving side is explained with a case (comparative example). In the comparative example, a coil on the power-transmitting side is formed by one disk-type coil and a coil on the power-receiving side is formed by one solenoid-type coil. FIG. 4 is conceptual diagrams for explaining a magnetic flux distribution ($\phi$) and reception voltage between coils of a non-contact power feeding apparatus according to a comparative example. In the comparative example, the coil on the power-receiving side is formed from one solenoid-type coil. Other configurations are the same as the configuration illustrated in FIG. 1.

Assume that the center point of the power receiving coil and the center point of the power transmitting coil 5 are on the Z-axis and the power receiving coil faces the power transmitting coil 5. In such the case, the magnetic flux output from the disk-type power transmitting coil 5 spreads radially from the center point on the coil surface of the power transmitting coil 5 while heading toward the power receiving coil. Further, in accordance with interlinkage magnetic flux that passes through the power receiving coil, the voltage received by the power receiving coil is as illustrated in FIG. 4.

The relation of the magnetic flux and reception voltage is explained by dividing the power receiving coil into three. Assume that the power receiving coil is divided into two end parts in the X-axis direction and a middle part sandwiched between the end parts. However, voltage distribution in each of the divided three parts cannot be actually measured because the power receiving coil is formed by one solenoid-type coil. FIG. 4 shows voltage that corresponds to each part for explanatory convenience.

In the power receiving coil, interlinkage magnetic flux that withpasses through each of the coils is orthogonal to the coil axis (which is parallel to the X-axis) at a part positioned on the Z-axis. Accordingly, in the middle part of the power receiving coil, the power-reception magnetic flux (interlinke magnetic flux) becomes zero and the reception voltage becomes zero.

Between the X-directional ends of the solenoid-type power receiving coil, in the end part positioned to the positive direction of the X-axis, the magnetic flux heads toward the positive direction of the X-axis. On the other hand, in the end part positioned to the negative direction of the X-axis, the magnetic flux heads toward the negative direction of the X-axis. In other words, in the coils positioned to the X-directional ends, the direction of the magnetic flux becomes opposite.

When the polarity of the coil is represented as positive for one end to which the magnetic flux enters and negative for the other end from which the magnetic flux exits, the polarity at the end part positioned in the X-axis positive direction and the polarity at the end part positioned in the X-axis negative direction becomes opposite. For this reason, the reception voltage at the end part positioned in the X-axis positive direction becomes +V. The reception voltage at the end part positioned in the X-axis negative direction becomes –V. In other words, in the power receiving coil as a whole, since the reception voltages at both end parts cancel each other, the reception voltage in the power receiving coil becomes zero.

Figure 5:
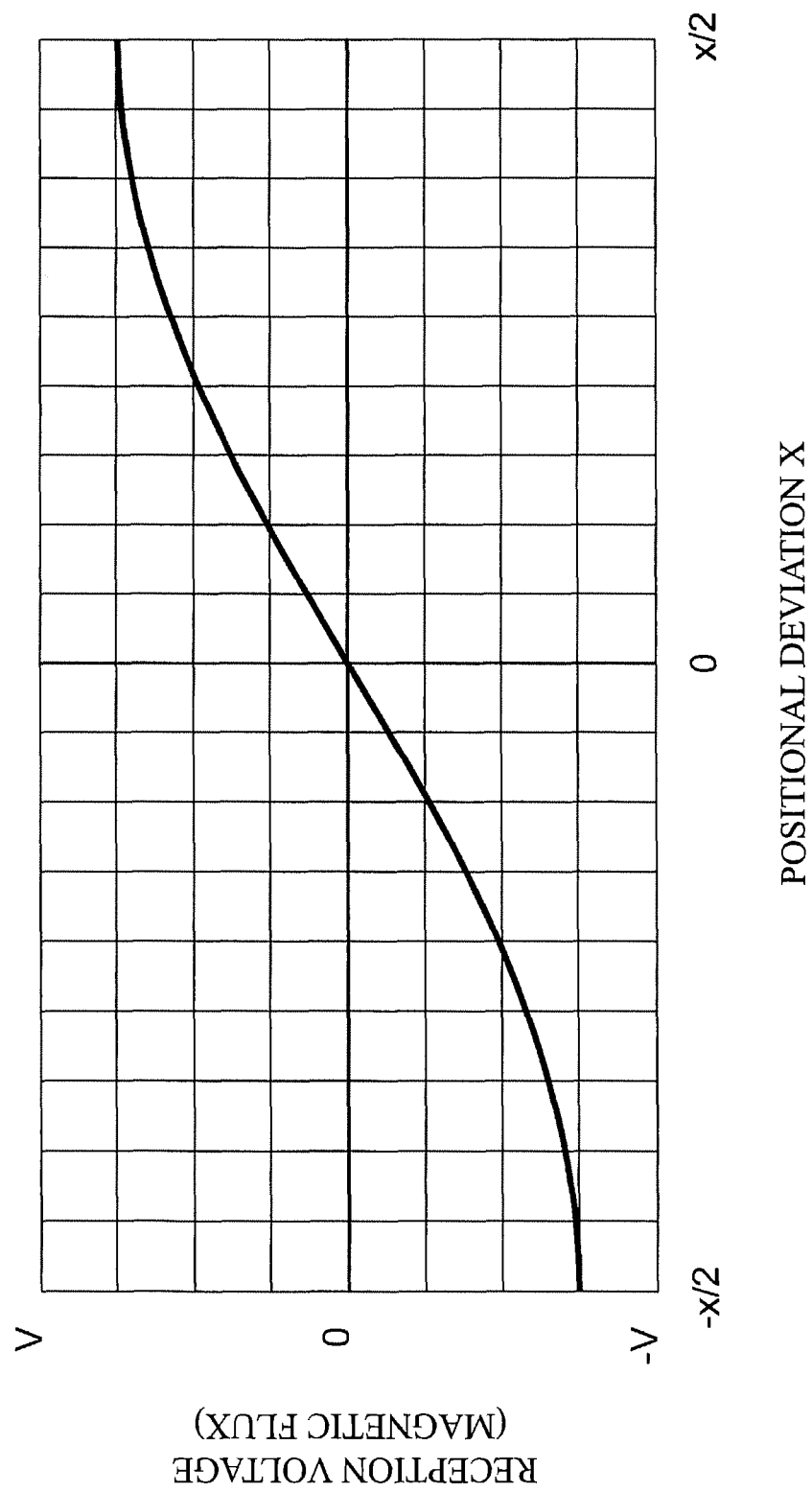
FIG. 5 is a graph illustrating the relation between a positional deviation of a power receiving coil relative to the position of a power transmitting coil and reception voltage of the non-contact power feeding apparatus according to the comparative example.

Next, for the non-contact power feeding apparatus according to the comparative example, the relation of a position of the power receiving coil relative to the power transmitting coil 5 and reception voltage of the power receiving coil is explained using FIG. 5. FIG. 5 is a graph illustrating the relation between a positional deviation of a power receiving coil relative to the position of a power transmitting coil 5 and reception voltage.

As for the coordinate for the X-axis direction, the center point of the power transmitting coil 5 is considered to be "0". The length of the power transmitting coil 5 along the X-axis direction is "x", and the end positions of the power transmitting coil 5 are shown in coordinates of "–x/2" and "x/2" respectively. Then, when the center point of the power receiving coil is on the Z-axis that passes through the center point of the power transmitting coil 5, the positional deviation (x) becomes "0". More, when the center point of the power receiving coil is on the Z-axis that passes through the "–x/2" point of the power transmitting coil 5, the positional deviation (x) becomes "–x/2". Further, when the center point of the power receiving coil is on the Z-axis that passes through the "x/2" point of the power transmitting coil 5, the positional deviation (x) becomes "x/2". Incidentally, for ease of explanation, it is considered that there is no positional deviation in the Y-direction.

When the positional deviation of the power receiving coil relative to the power transmitting coil 5 is "–x/2", the receiving electric power becomes –V (Minimum). Then, as the center point of the power receiving coil becomes closer to the center point of the power transmitting coil 5, the receiving electric power gradually approaches "0", and when the power receiving coil faces the power transmitting coil 5, the receiving electric power becomes "0". More, as the positional deviation of the power receiving coil becomes larger than "0", the receiving electric power increases, and when the positional deviation is "x/2", the receiving electric power becomes +V (Maximum).

In the comparative example, when the power transmitting coil 5 faces the power receiving coil, the receiving electric power becomes zero and the power receiving coil becomes a state in which the receiving electric power cannot be received. Accordingly, in the present embodiment, the power receiving coil 6 is formed from a plurality of coils 61 to 63 and the polarity in each of the coils 61 to 63 is switched in accordance with the interlinkage magnetic flux that passes through each of the coils 61 to 63.

Figure 6:
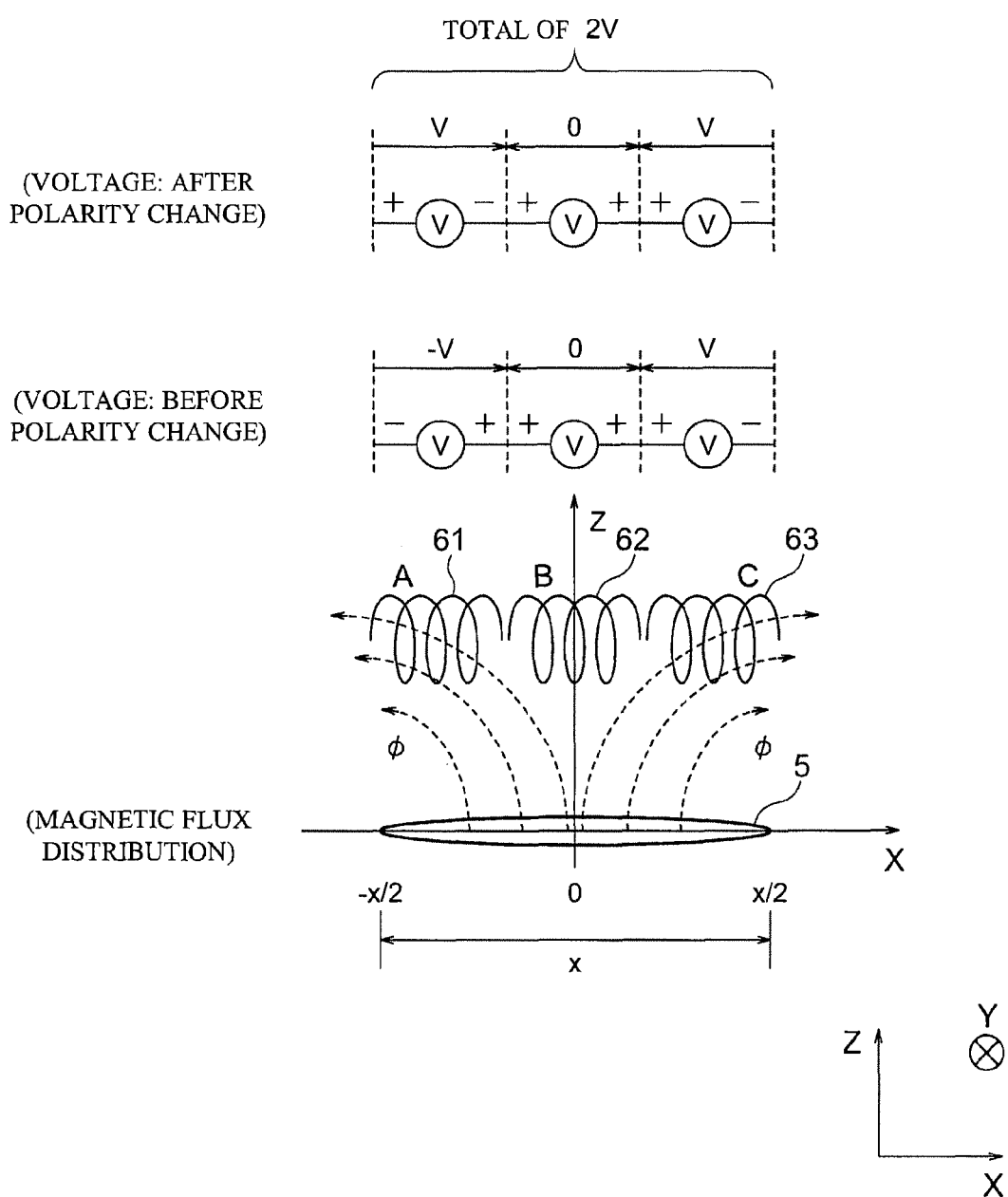
FIG. 6 is conceptual diagrams for explaining a magnetic flux distribution (φ) and reception voltage between coils of the non-contact power feeding apparatus in FIG. 1.
Figure 7:
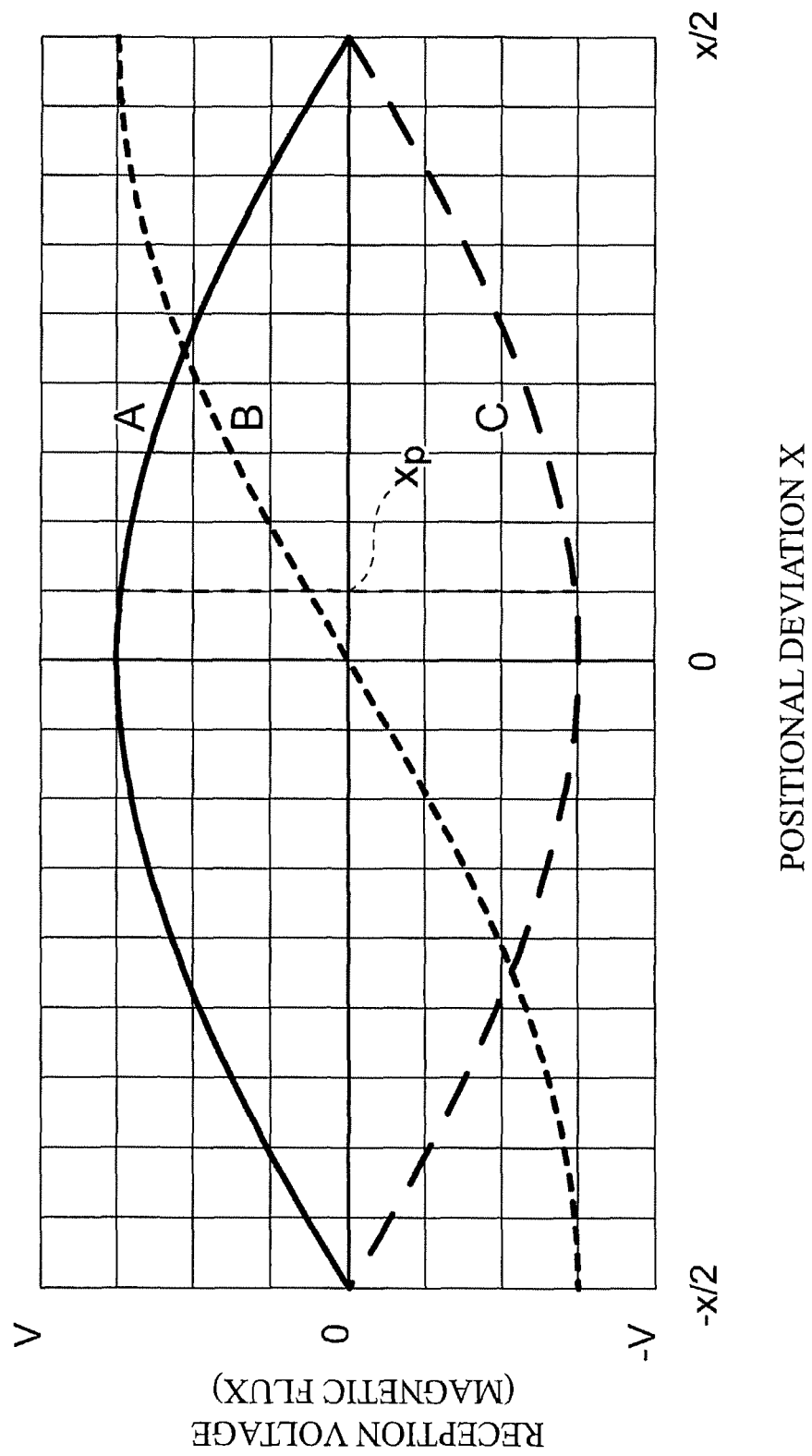
FIG. 7 is a graph illustrating the relation between a positional deviation and reception voltage of a power receiving coil of the non-contact power feeding apparatus in FIG. 1.

For the non-contact power feeding apparatus according to the present embodiment, principles of improving the receiving electric power by changing the polarity of the coils 61 to 63 are explained using FIG. 6 and FIG. 7. FIG. 6 is conceptual diagrams for explaining a magnetic flux distribution (φ) and reception voltage between coils. FIG. 7 is a graph illustrating the relation between the positional deviation of the power receiving coil 6 relative to the power transmitting coil 5 and reception voltage in each of the coils 61 to 63. Also, in FIG. 6, a notation method of coordinates, size of the power transmitting coil 5, etc., are the same as in FIG. 4. Further, the positional deviation shown in FIG. 7 represents a positional deviation of the center point (center point in the X-direction) of the coil 62. The notation of the X-directional coordinates representing the positional deviation is the same as in FIG. 5. In FIG. 7, graph A represents the receiving electric power of the coil 61, graph B represents the receiving electric power of the coil 62, and graph C represents the receiving electric power of the coil 63.

The direction of the magnetic flux generated by electric conduction to the power transmitting coil 5 is the same as in the comparative example. The interlinkage magnetic flux that passes through the coil 61 heads toward the negative direction of the X-axis. The interlinkage magnetic flux that passes through the coil 63 heads toward the positive direction of the X-axis. Also, the interlinkage magnetic flux that passes through the coil 62 is orthogonal to the coil axis (parallel to the X-axis). Accordingly, before changing polarity of the coils, the reception voltages of the coil 61, coil 62, and coil 63 are −V, 0, and +V respectively.

Further, when the coil 61 to coil 63 are connected in series without changing the polarity of the coils, the receiving electric power of the power receiving coil 6 is zero as in the comparative example. For this reason, in the present embodiment, the receiving electric power of the coil 61 is changed from −V to +V by reversing the polarity of the coil 61. In this way, the reception voltages of the coil 61, coil 62, and coil 63 become +V, 0, and +V after the polarity change. Then, when the coil 61 and coil 63 after polarity inversion are connected in series, the receiving electric power of the power receiving coil 6 becomes 2V.

Also, as shown in FIG. 7, each of the reception voltages of the coils 61 to 63 shows different characteristics in accordance with the positional deviation of the power receiving coil 6 relative to the power transmitting coil 5. When the positional deviation is X=0, as shown in FIG. 6, the values of the magnetic flux in the coils 61 and 63 are finite values (that is, not zero), and the polarity becomes opposite between the coil 61 and coil 63. Accordingly, by reversing the polarity of either coil of the coil 61 and coil 63, the reception voltage of the power receiving coil 6 becomes larger. Further, when the position of the power receiving coil 6 deviates slightly from the position facing the power transmitting coil 5 (which corresponds to X=0) and when the positional deviation of the power receiving coil 6 relative to the position of the power transmitting coil 5 becomes $x_p$, for example, the polarity of the coil 63 is opposite to the polarity of the coils 61 and 62. For this reason, by reversing the polarity of the coil 63, the reception voltage of the power receiving coil 6 increases.

The polarity is reversed by reversing the direction of the current flowing through the coil. For example, assume that the winding directions of the wire to be wound in the coil 61 and coil 63 are the same and the terminals at both ends of the coils 61 and 63 are terminal "a" and terminal "b". When the current flows in the direction from the terminal a to terminal b in each of the coil 61 and coil 63, the direction of the current that flows in the coil 61 and the direction of the current that flows in the coil 63 become the same direction. Under such conditions, in order to reverse the polarity of the coil 63, the connection of the coil 63 is changed so that the direction of the current flowing through the coil 63 becomes the direction from terminal "b" to terminal "a". The connection of the coils 61 to 63 is described later together with the detailed configuration of the switching circuit 8.

Figure 8:
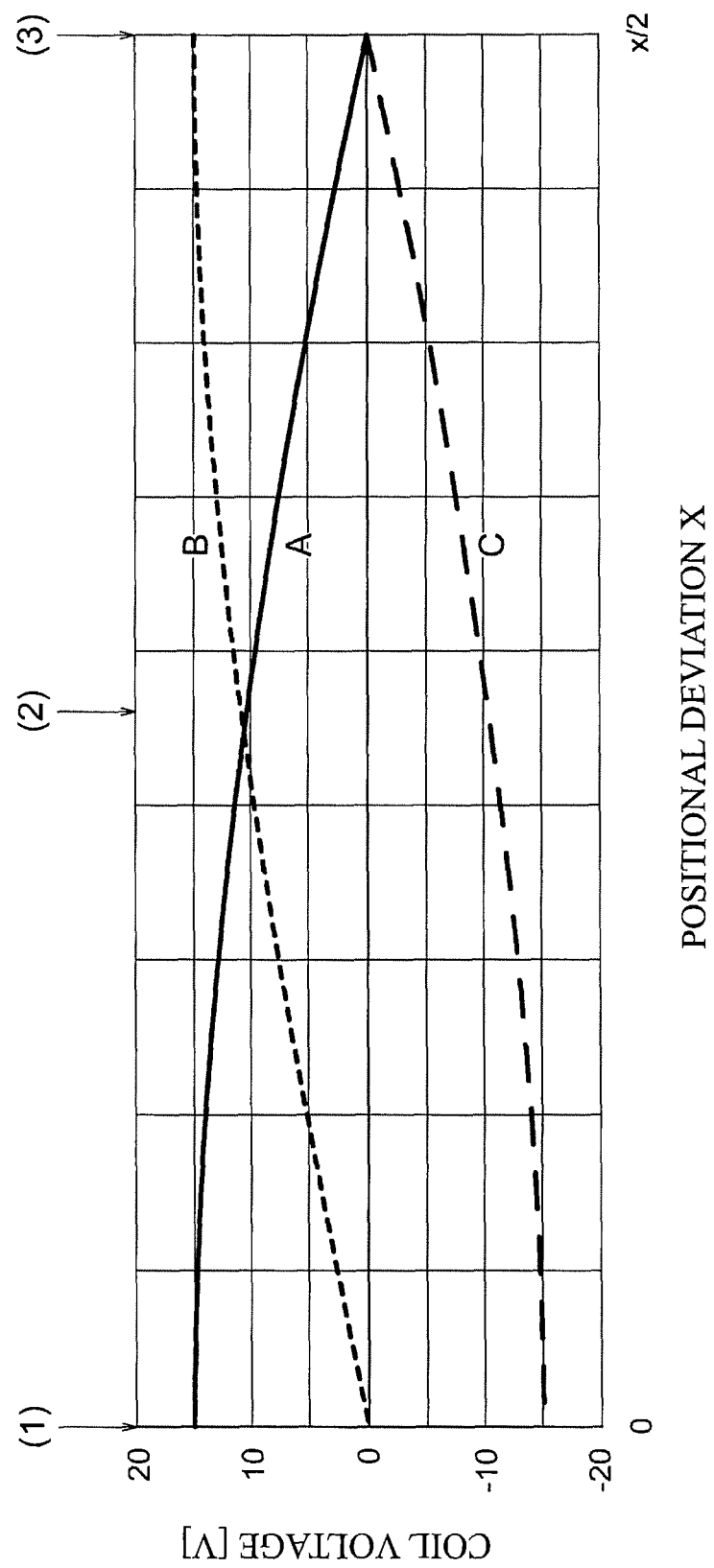
FIG. 8 is a graph illustrating a characteristic of the reception voltage relative to the positional deviation for the positional deviation range from 0 to x/2.

Next, using FIG. 8 and FIG. 9, the polarity of the coils 61 to 63 and the connecting state of the coils 61 to 63 relative to the positional deviation of the power receiving coil 6 are explained. FIG. 8 is a graph illustrating a characteristic of the reception voltage relative to the positional deviation for the positional deviation range from 0 to x/2. FIG. 9 is conceptual diagrams for explaining polarity of a plurality of the coils 61 to 63 and connection between the coils 61 to 63. Also, (1) to (3) shown in FIG. 8 correspond to (1) to (3) shown in FIG. 9 respectively. For example, when the positional deviation of the power receiving coil 6 is "0", the polarity of the coils 61 to 63 and the connection between the coils become as shown in (1) of FIG. 9. Additionally, for explanatory convenience, the unit of the voltage shown in FIG. 7 and FIG. 8 is 5V (volts) per one cell.

When the power receiving coil 6 faces the power transmitting coil 5, the positional deviation of the power receiving coil 6 becomes "0" (which corresponds to the state (1) in FIG. 8). In such the case, the reception voltages (A, B, and C) of the coils 61 to 63 are 15V, 0V, and −15V respectively. As the reception voltage of the coil 62 is zero, even when the coil 62 is connected to the coils 61 and 63, the coil 62 cannot receive the electric power, and coil loss (copper loss) occurs for the current that flows from the coils 61 to the coil 62 and from the coils 63 to the coil 62. Accordingly, the coil 62 is not connected to the coils 61 and 62, and the both terminals of the coil 62 are released. As shown, in the embodiment, coil loss can be suppressed and electric power efficiency is improved by releasing a coil of which their receiving electric powers are zero among the coils 61 to 63.

More, since the reception voltage of the coil 63 is −15V and the polarity of the coil 63 is opposite to the polarity of the coil 61, the polarity of the coil 63 is changed. Then, as shown in (1) of FIG. 9, the coils 61 and coil 63 are connected in series.

When the positional deviation of the power receiving coil 6 is "x/4" (which corresponds to the state (2) in FIG. 8), the reception voltages (A, B, and C) of the coils 61 to 63 are 10V, 10V, and −10V respectively. Since the polarity of the coil 63 is opposite to the polarity of the coil 61 and coil 62, the polarity of the coil 63 is changed. Then, as shown in (2) of FIG. 9, the coil 61 to coil 63 are connected in series.

When the positional deviation of the power receiving coil 6 is "x/2" (which corresponds to the state (3) in FIG. 8), the reception voltages (A, B, and C) of the coils 61 to 63 are 0V, 15V, and 0V respectively. Since the receiving electric power by the coils 61 and 63 is zero, end terminals of the coils 61 and 63 are released. Then, as shown in (3) of FIG. 9, the coil 62 is connected to the resonant circuit 9 through the switching circuit 8.

Figure 10A:
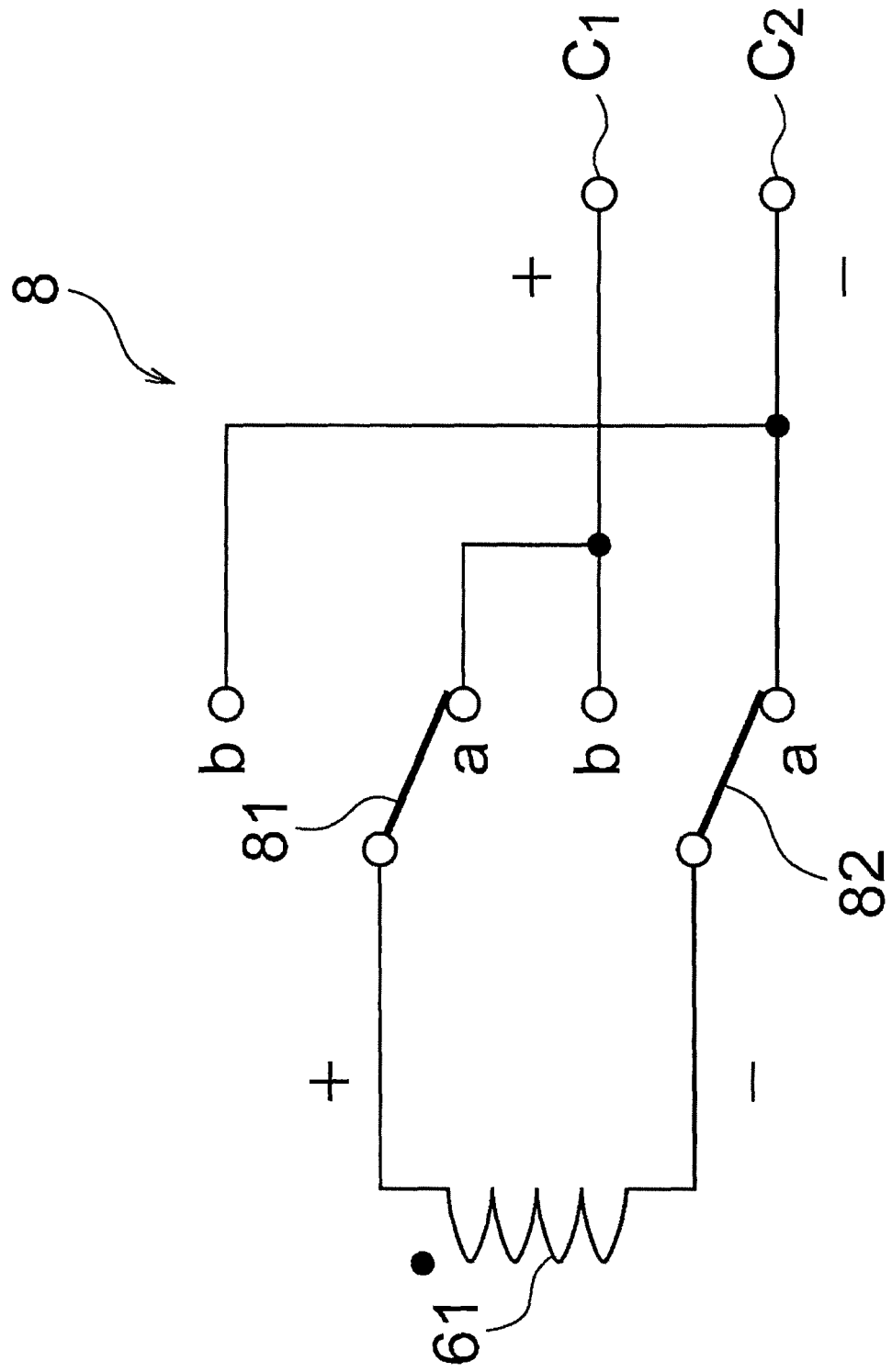
FIG. 10A illustrates a circuit diagram of a switching circuit in FIG. 1 in a state in which terminals of a coil are connected in a forward direction.
Figure 10B:
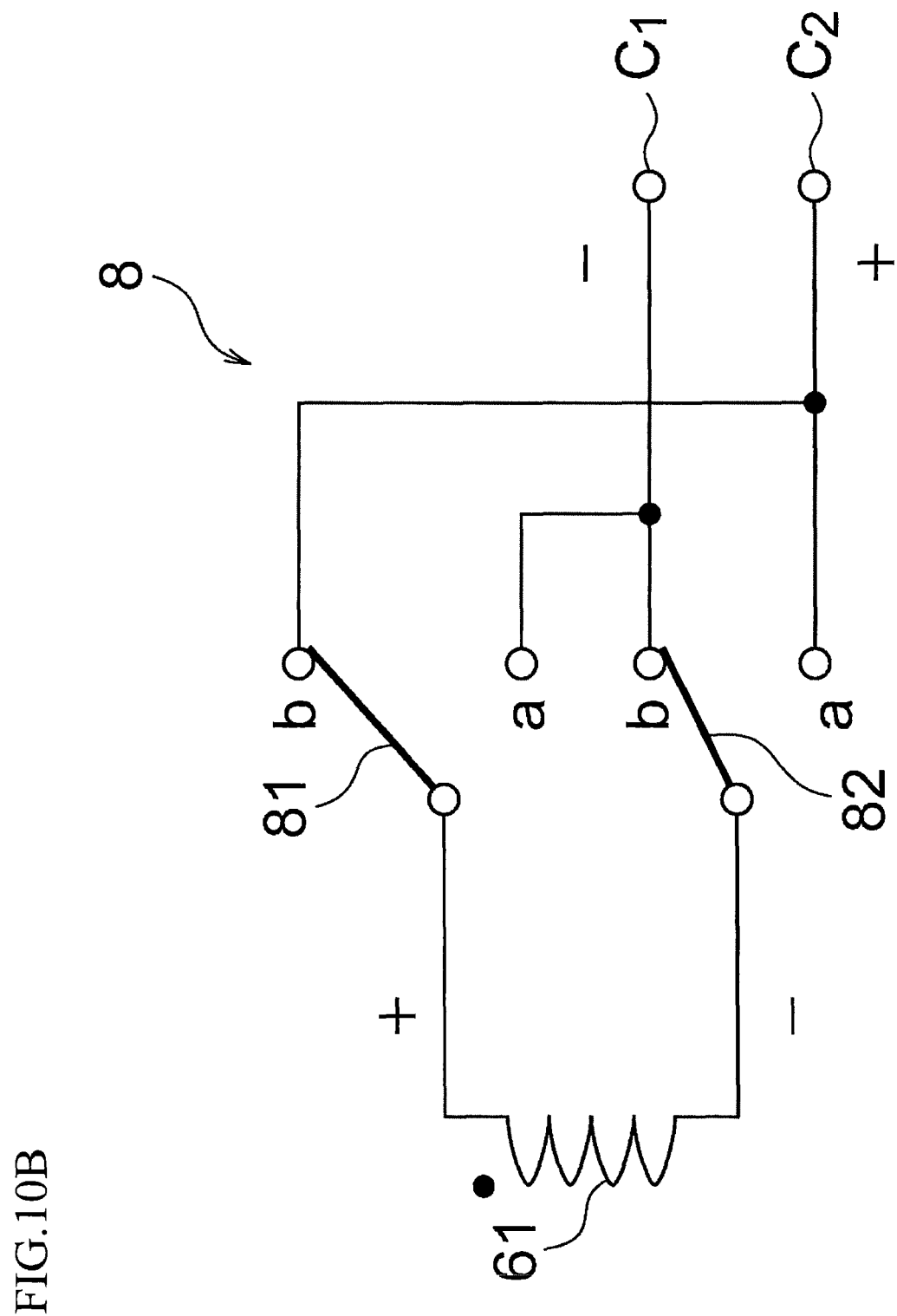
FIG. 10B illustrates a circuit diagram of a switching circuit in FIG. 1 in a state in which terminals of a coil are connected in a backward direction.
Figure 10C:
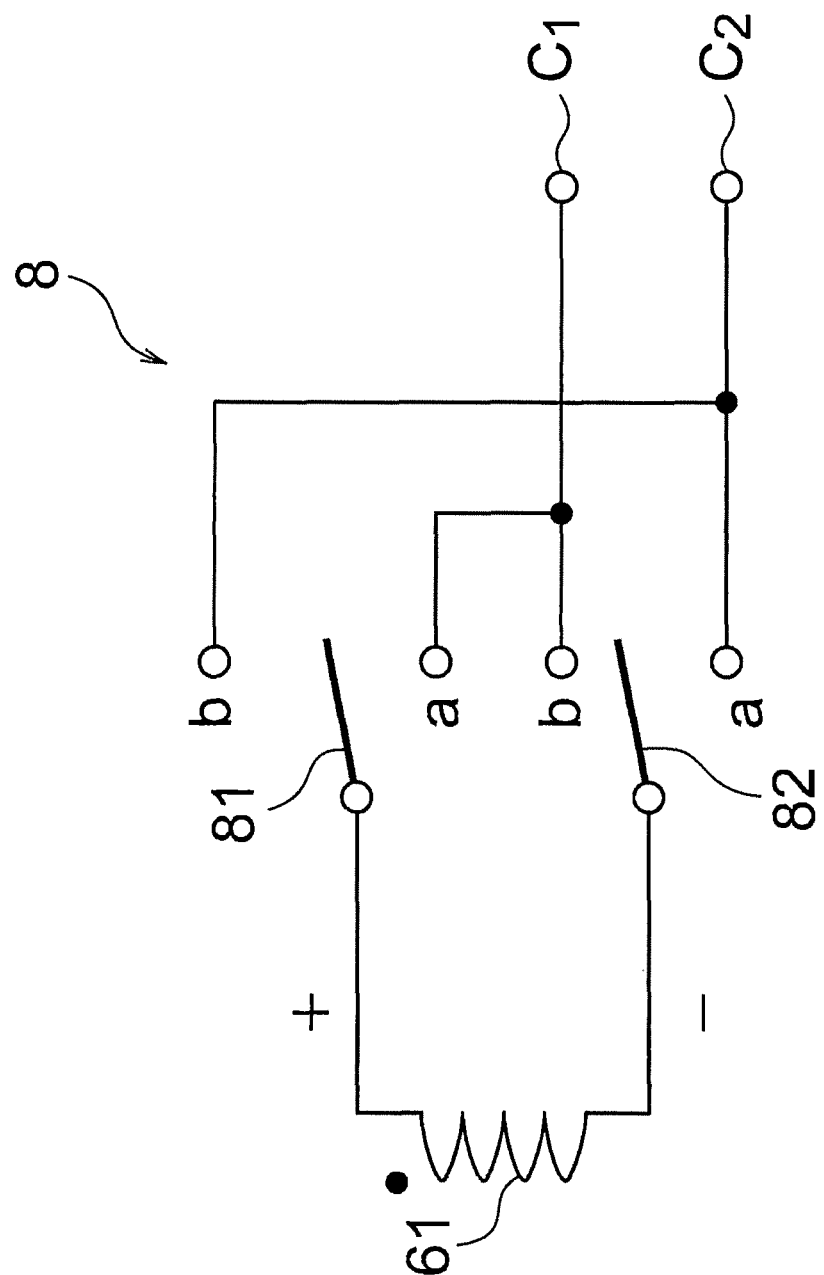
FIG. 10C illustrates a circuit diagram of a switching circuit in FIG. 1 in a state in which connections of the coil terminals are released.

Next, the configuration of the switching circuit 8 and connection of the coils 61 to 63 are explained using FIG. 10A to 10C. FIG. 10A to 10C is a circuit diagrams of the switching circuit 8. FIG. 10A illustrates a circuit diagram of a state in which terminals of the coil 61 are connected in a forward direction. FIG. 10B illustrates circuit diagram of a state in which terminals of the coil 61 are connected in a backward direction. FIG. 10C illustrates a circuit diagram of a state in which connection of the terminals of the coil 61 are released. Although the configuration of the circuit for connecting with the coil 61 is illustrated in FIG. 10A to 10C, the switching circuit 8 also includes a circuit for connecting with the coil 62 and coil 63 like the circuit of the connecting section with the coil 61. Since the circuit for connecting with the coil 62 and coil 63 is the same as the connection with the coil 61, its explanation is omitted.

As shown in FIG. 10A to 10C, the switching circuit 8 includes a switch 81 and a switch 82. The switch 81 is connected to one terminal of the end terminals of the coil 61, and the switch 82 is connected to the other terminal of the coil 61. The switch 81 and switch 82 switch between a contact point "a" and a contact point "b". More, the switches 81 and 82 can be in a released state in which they are not connected with the contact point "a" and contact pint "b". Also, two contact points "a" are respectively connected with two terminals ($C_1$ and $C_2$), which become the output terminals. Further, two contact points "b" are respectively connected with the output terminals ($C_1$ and $C_2$). The output terminals ($C_1$ and $C_2$) are connected to the switching circuit 8 or the resonant circuit 9 for connection with the coils 62 and 63.

When the polarity of the coil 61 is not to be changed, the switches 81 and 82 are connected to the contact points "a". As shown in FIG. 10A to 10C, when one coil terminal is considered to be "+" and the other coil terminal to be "−" relative to the wound wire direction of the coil 61. The output terminal "$C_1$" becomes "+" and the output terminal "$C_2$" becomes "−" when the switches 81 and 82 are connected to the contact points "a" (see FIG. 10A). In this way, the switching circuit 8 makes the connection with the coil 61 to a state of a forward-direction connection so as not to change the polarity of the coil 61.

When the polarity of the coil 61 is to be changed, the switches 81 and 82 are connected to the contact points "b". As shown in FIG. 10B, when the switches 81 and 82 are connected to the contact points "b", the output terminal "$C_1$" becomes "−" and the output terminal "$C_2$" becomes "+". In this way, the switching circuit 8 makes the connection with the coil 61 to a state of a backward-direction connection and switches the polarity of the coil 61.

To release connection of the coil 61, the switches 81 and 82 are not connected to the contact points "a" and contact points "b". As shown in FIG. 10C, when the switches 81 and 82 are not in connection with the contact points "a" and "b", the output terminals "$C_1$" and "$C_2$" are not connected to the coils 62 and 63 and the output terminals "$C_1$" and "$C_2$" are also not connected to the resonant circuit 9. In this way, the switching circuit 8 makes the connection with the coil 61 to a released state.

Additionally, although the circuit configuration is not specifically shown in the drawing, the switching circuit 8 has a circuit configuration so that the connection circuit to the coil 61, the connection circuit to the coil 62, and the connection circuit to the coil 63 are selectively connected in series. Also, the switching circuit 8 has a circuit configuration so that each of these connection circuit or the connection circuits connected in series are connected with the resonant circuit 9.

Figure 11:
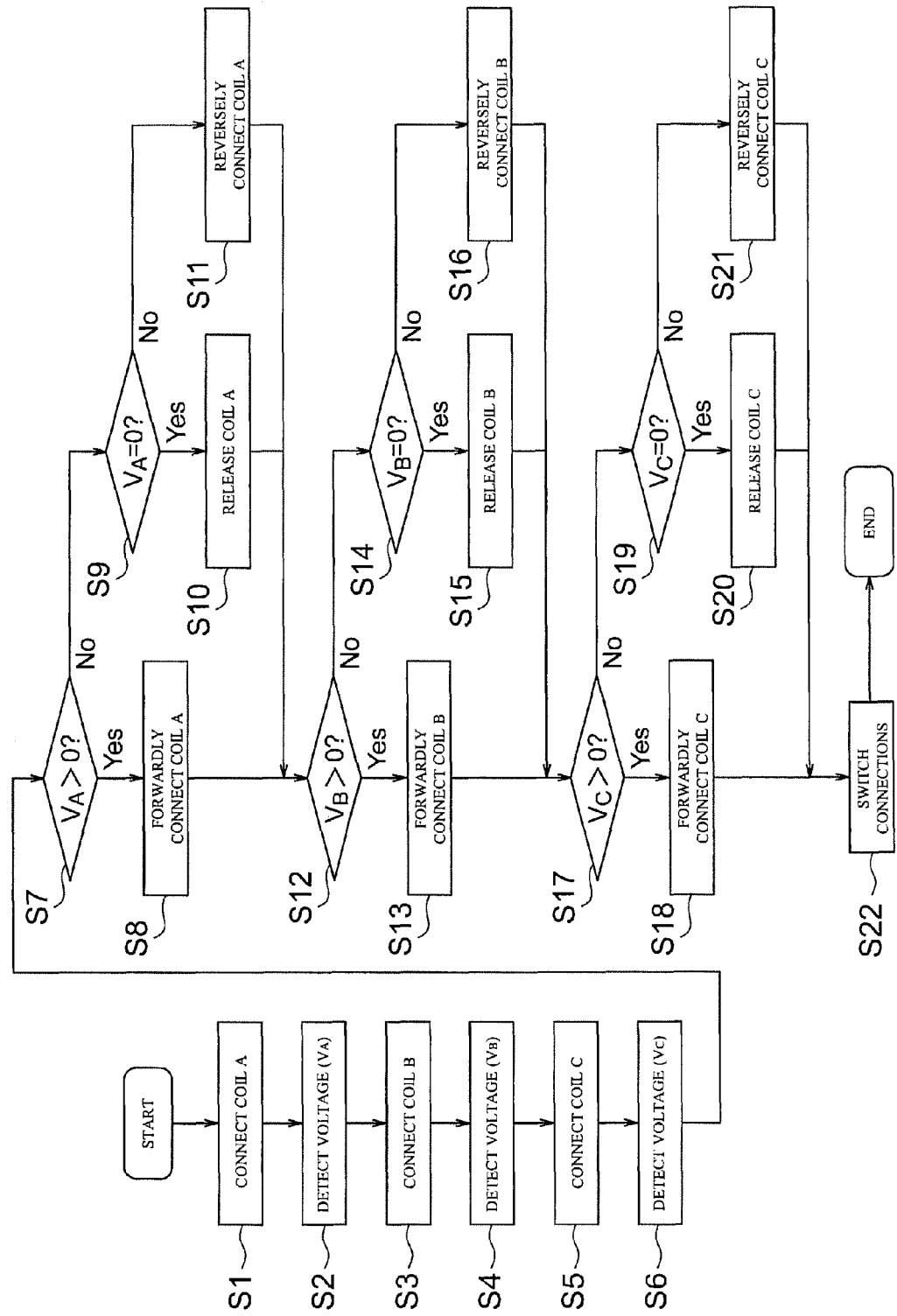
FIG. 11 is a flowchart illustrating a control sequence of a controller in FIG. 1.

Next, using FIG. 11, control of a controller 12 is explained. FIG. 11 is a flowchart illustrating a control flow of the controller 12. The coils A, B, and C shown in FIG. 11 correspond to the coils 61 to 63 respectively.

As above, the polarity of the coils 61 to 63 are correlated with "+" and "−" of the reception voltage of the coils 61 to 63. Accordingly, when connecting the coils 61 to 63 one by one, using the voltage sensor 7 connected to each of the coils 61 to 63, the controller 12 detects the reception voltage of the coils 61 to 63. Then, the controller 12 determines the polarity of the coils 61 to 63 on the basis of the voltage detected by the voltage sensor 7 and controls the switching circuit 8 on the basis of the determined result. In the following, a control flow of a controller is explained in detail.

In step S1, the controller 12 controls the switching circuit 8 so as to connect the coil 61 to the switching circuit 8 and set the coils 62 and 63 to a released state. In step S2, the controller 12 detects the reception voltage ($V_A$) of the coil 61 using the voltage sensor 7 connected to the coil 61.

In step S3, the controller 12 controls the switching circuit 8 so as to connect the coil 62 to the switching circuit 8 and set the coils 61 and 63 to a released state. In step S4, the controller 12 detects the reception voltage ($V_B$) of the coil 62 using the voltage sensor 7 connected to the coil 62.

In step S5, the controller 12 controls the switching circuit 8 so as to connect the coil 63 to the switching circuit 8 and set the coils 61 and 62 to a released state. In step S6, the controller 12 detects the reception voltage ($V_C$) of the coil 63 using the voltage sensor 7 connected to the coil 63. More, after detection of the reception voltage ($V_C$) of the coil 63, the controller 12 temporarily sets the coil 63 to a released state by controlling the switching circuit 8.

In step S7, the controller 12 determines whether or not the detected voltage ($V_A$) of the coil 61 is positive. When the detected voltage ($V_A$) is positive, the controller 12 controls the switching circuit 8 and sets the connection with the coil 61 to forward-directional connection (step S8). Whereas, when the detected voltage ($V_A$) is not positive, the controller 12 determines whether or not the detected voltage ($V_A$) of the coil 61 is zero in step S9. When the detected voltage ($V_A$) is zero, the controller 12 controls the switching circuit 8 and sets the connection with the coil 61 to a released state (step S10). When the detected voltage ($V_A$) is not zero (when the detected voltage ($V_A$) is negative), the controller 12 controls the switching circuit 8 and sets the connection with the coil 61 to backward-directional connection (step S11).

In step S12, the controller 12 determines whether or not the detected voltage ($V_B$) of the coil 62 is positive. When the detected voltage ($V_B$) is positive, the controller 12 controls the switching circuit 8 and sets the connection with the coil 62 to forward-directional connection (step S13). Whereas, when the detected voltage ($V_B$) is not positive, the controller 12 determines whether or not the detected voltage ($V_B$) of the coil 62 is zero in step S14. When the detected voltage ($V_B$) is zero, the controller 12 controls the switching circuit 8 and sets the connection with the coil 62 to a released state (step S15). When the detected voltage ($V_B$) is not zero (when the detected voltage ($V_B$) is negative), the controller 12 controls the switching circuit 8 and sets the connection with the coil 62 to backward-directional connection (step S16).

In step 17, the controller 12 determines whether or not the detected voltage ($V_C$) of the coil 63 is positive. When the detected voltage ($V_C$) is positive, the controller 12 controls the switching circuit 8 and sets the connection with the coil 63 to forward-directional connection (step S18). Whereas, when the detected voltage ($V_C$) is not positive, the controller 12 determines whether or not the detected voltage ($V_C$) of the coil 63 is zero in step S19. When the detected voltage ($V_C$) is zero, the controller 12 controls the switching circuit 8 and sets the connection with the coil 63 to a released state (step S20). When the detected voltage ($V_C$) is not zero (when the detected voltage ($V_C$) is negative), the controller 12 controls the switching circuit 8 and sets the connection with the coil 63 to backward-directional connection (step S21).

In step S22, the controller 12 controls the switching circuit 8 so that the coils 61 to 63 connected in a forward direction or in a backward direction are mutually connected in series. Then, the control flow shown in FIG. 11 completes.

After completion of the control flow above, the controller 12 charges the battery with the electric power received by the power receiving coil 6 while managing the state of the battery which is the load 11.

Figure 12:
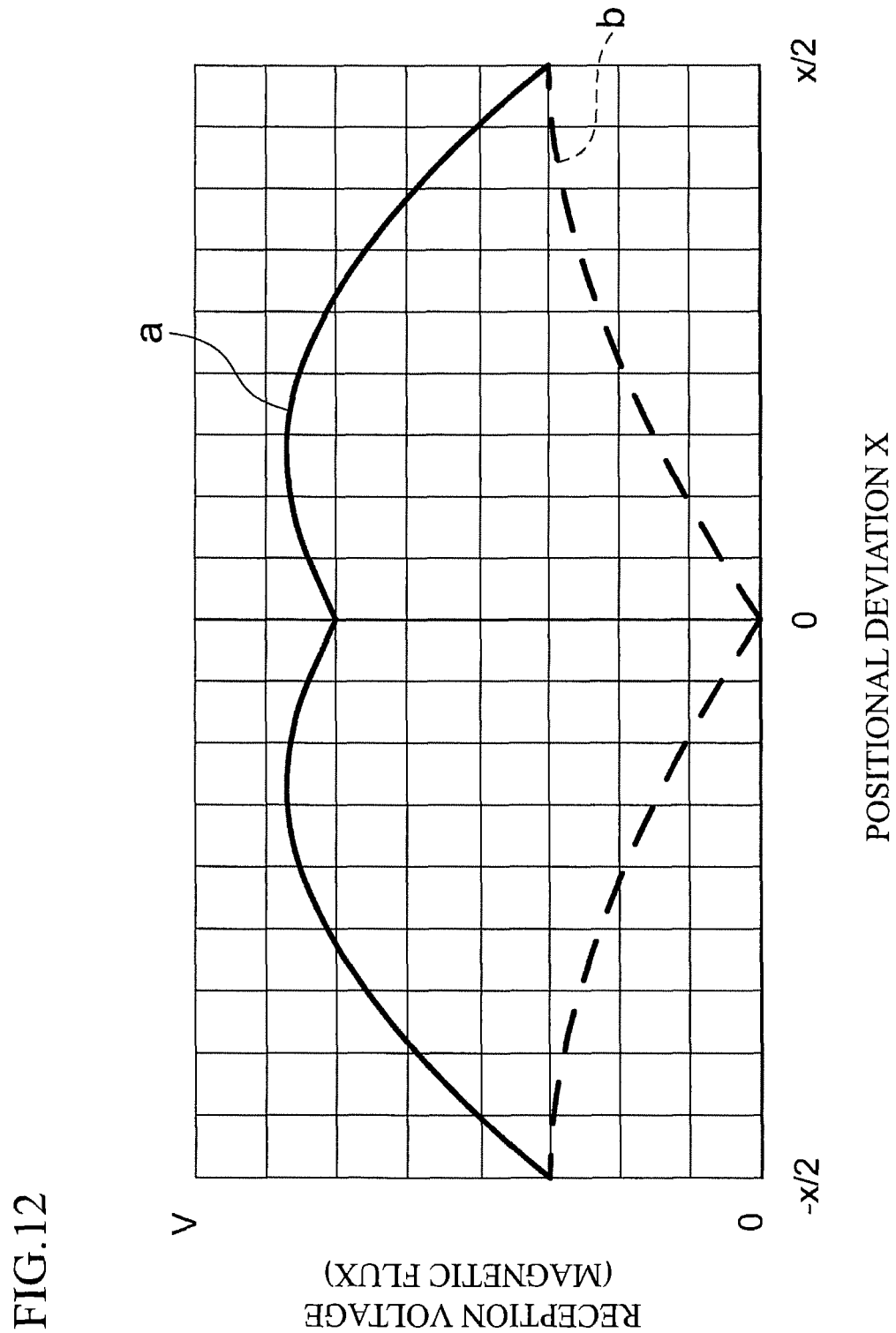
FIG. 12 is a graph illustrating characteristics of the reception voltage relative to the positional deviation of the power receiving coil.

Next, for the non-contact power feeding apparatus according to the present embodiment, characteristics of the reception voltage relative to the positional deviation of the power receiving coil 6 is explained with comparison to the comparative example. FIG. 12 is a graph illustrating characteristics of the reception voltage relative to the positional deviation of the power receiving coil 6. The graph "a" illustrates the characteristic of the embodiment, and the graph "b" illustrates the characteristic of the comparative example. The configuration in the comparative example is the same as the above.

As shown in FIG. 12, in the comparative example, when the power receiving coil faces the power transmitting coil 5, reception voltages at the end parts are mutually cancelled and the reception voltage of the power receiving coil becomes zero because directions the interlink magnetic flux that passes through the end parts of the power receiving coil are opposite to each other. Accordingly, the power receiving coil cannot receive the electric power.

On the other hand, in the present embodiment, when the power receiving coil faces the power transmitting coil 5, since the polarity of the coil 63 which corresponds to one end of the power receiving coil 6 is changed, the magnetic flux is added without cancelling out the reception voltage and the reception voltage increases. As a result, the power receiving coil 6 can receive the maximum electric power.

As above, the present embodiment includes a power receiving coil 6 including a plurality of coils 61 to 63 sharing their coil axes and a switching circuit for switching connections with the coils 61 to 63. Also, by the switching circuit 8, the polarity of the coils 61 to 63 is switched according to interlinkage magnetic flux that passes through each of the coils 61 to 63. In this way, the reception voltage of the power receiving coil 6 is added in accordance with the interlinkage magnetic flux that passes through the power receiving coil, and thus the reception voltage can be improved. As a result, the receiving electric power can be increased.

Additionally, in the present embodiment, the direction of connection with the coils 61 to 63 is set to a forward direction when the detected voltage of the voltage sensor 7 is positive, the direction of the connection with the coils 61 to 63 is reversed when the detected voltage is negative, and the connections with the coils 61 to 63 are set to a released state when the detected voltage is zero. In this way, the reception voltage can be added while changing the polarity of the coils 61 to 63, and thus the receiving electric power can be improved. Further, by releasing the coils 61 to 63 of which induced voltage is zero, a coil loss can be suppressed as an electric current does not flow through the released coil and efficiency of the electric power improves.

Further, in the present embodiment, the coils 61 to 63 connected in a forward direction and the coils 61 to 63 connected in backward direction are connected in series. In this way, the reception voltage can be added and the voltage supplied to the load 11 can be increased. As a result, the output electric power to the load 11 can be increased.

More, with regard to the voltage distribution in the above explanation (especially, the distributions of the voltage shown in FIG. 4 and FIG. 6), since the magnetic flux that passes through the power receiving coil 6 is an alternating current, in reality, "+(positive)", "0", and "−(negative)" of the reception voltage change with time. However, the distributions of the received power illustrate the distributions of the voltage detected at the same time (same timing). To detect the voltage in the same timing, the sensor detects the voltage at the timing of a trigger which is corresponding to the rise of the output voltage (rectangular wave) of the inverter 3.

Also, in the present invention and in the comparative example, the interlinkage magnetic flux that passes through the power receiving coil and the receiving electric power are equivalently treated since the interlinkage magnetic flux that passes through the coil on the power-receiving side is almost the same as the induced voltage of the coil (refer to the formula $V=L\times d\phi/dt$).

Further, the circuit of the switching circuit 8 is not limited to the circuit illustrated in FIG. 9 and the circuit of the switching circuit 8 may be another circuit.

Furthermore, in the present embodiment, although the polarity of the coils 61 to 63 is determined on the basis of the detected voltage of the voltage sensor 7, the polarity of the coils 61 to 63 may be determined according to the position of the power receiving coil 6 relative to the power transmitting coil 5. As shown in FIG. 7, the reception voltage of the coils 61 to 63 is correlated with the positional deviation of the power receiving coil 6. Also, positive or negative of the reception voltage by the coils 61 to 63 has an equivalence relationship with the polarity of the coils 61 to 63. Accordingly, when the positional deviation of the power receiving coil 6 can be confirmed, the polarity of the coils 61 to 63 can be determined. Further, the positional deviation of the power receiving coil 6 can be detected such as by a position sensor or camera disposed on the ground side or vehicle side.

Furthermore, the number of coils 61 to 63 included in the power receiving coil 6 is not limited to three, but can be two or four or more. As the number of coils forming the power receiving coil 6 increases, the magnetic flux distribution can be precisely determined, and the reception voltage can be improved.

The switching circuit 8 corresponds to "a switching unit" of the present invention, and the resonant circuit 9 and rectifier circuit 10 correspond to "a output unit" of the present invention.

Second Embodiment

A non-contact power feeding apparatus according to another embodiment of the present invention is explained. In the present embodiment, compared to the first embodiment described above, a connection state of a plurality of coils 61 to 63 in accordance with the detected voltage varies. Other configurations are the same as the first embodiment described above and their descriptions are referenced.

The controller 12 obtains a detected voltage by the voltage sensor 7 connected to each of the coils 61 to 63 and compares the absolute values of the detected voltages. Then, the controller 12 controls the switching circuit 8 in accordance with the comparison result of the absolute values of the detected voltages. The controller 12 connects the coils 61 to 63 having equal absolute values of the detected voltage in parallel. The controller 12 connects the coils 61 to 63 having different absolute values of the detected voltage in series. Then, the controller 12 makes the coils 61 to 63 having a detected voltage of zero into a released state.

Figure 13:
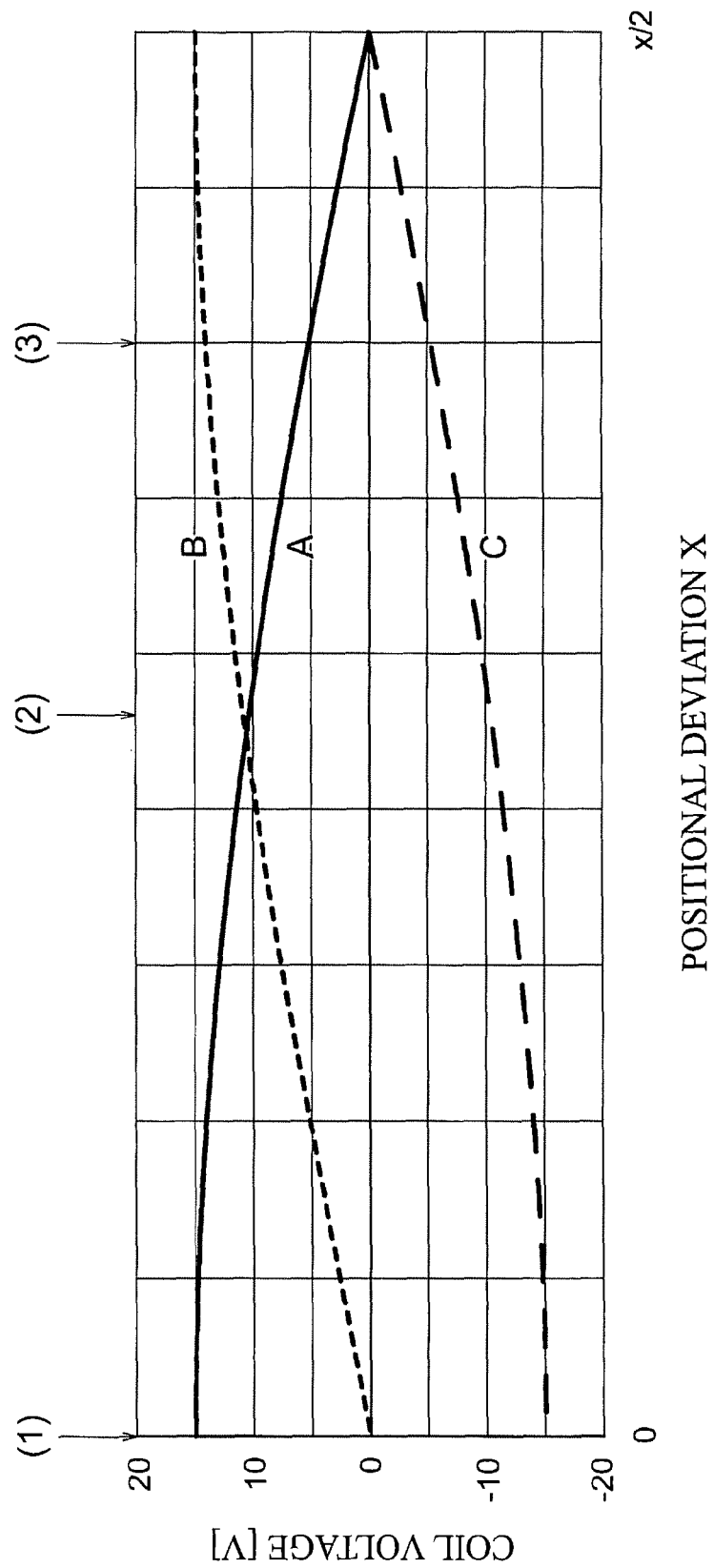
FIG. 13 is a graph illustrating the relation between a positional deviation of a power receiving coil and the reception voltage of a plurality of coils of a non-contact power feeding apparatus according to another embodiment of the present invention.
Figure 14:
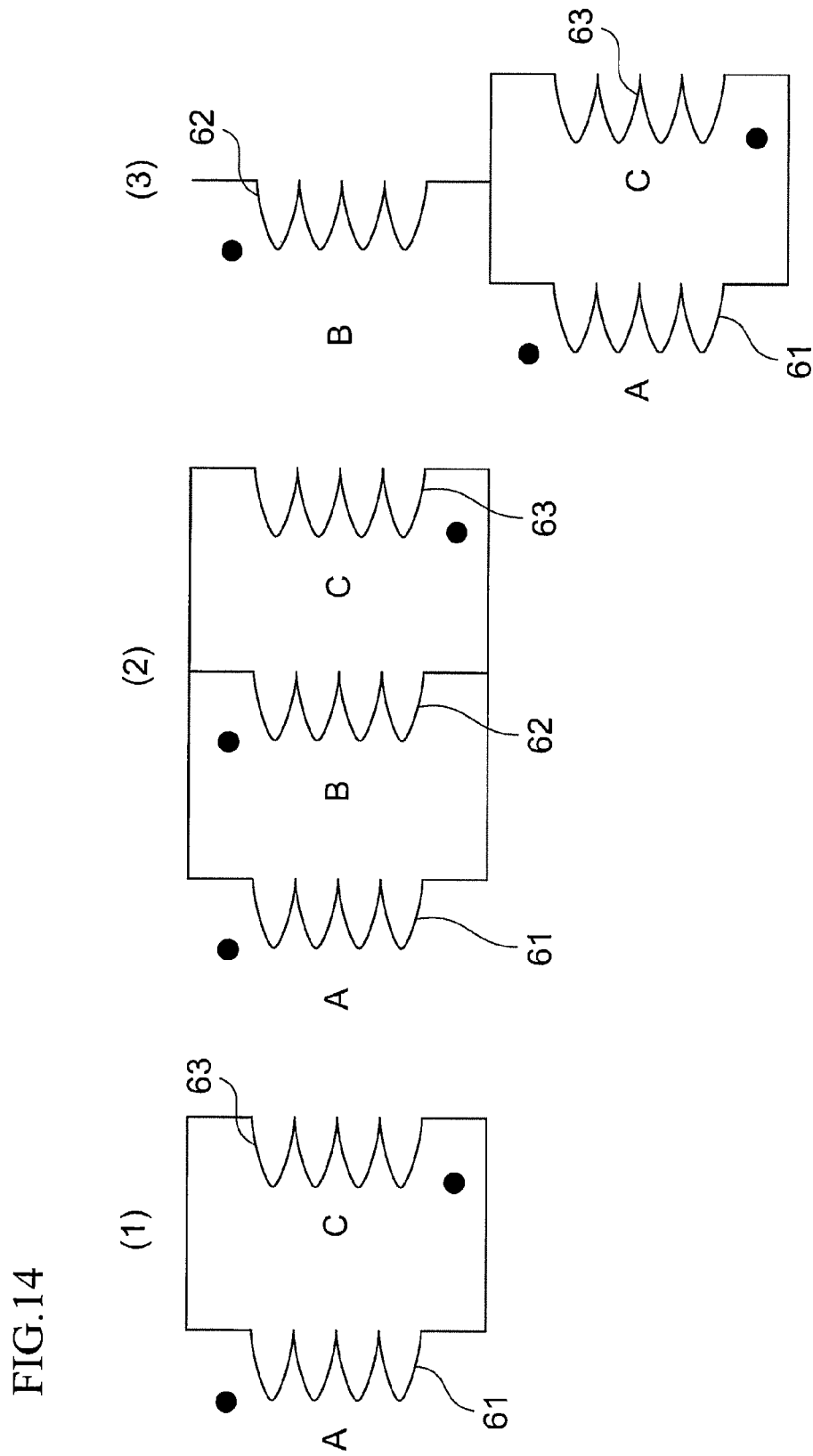
FIG. 14 is conceptual diagrams for explaining polarity of a plurality of coils on the power-receiving side and the connection between the coils of the non-contact power feeding apparatus according to another embodiment of the present invention.

Next, using FIG. 13 and FIG. 14, polarity of the coils 61 to 63 and the connecting state of the coils 61 to 63 relative to the positional deviation of the power receiving coil 6 are explained. FIG. 13 is a graph illustrating characteristics of the reception voltage relative to the positional deviation for the positional deviation range from 0 to x/2. FIG. 14 is conceptual diagrams for explaining polarities of a plurality of the coils 61 to 63 and connection between the coils 61 to 63. Also, (1) to (3) shown in FIG. 13 correspond to (1) to (3) shown in FIG. 14 respectively. For example, when the positional deviation of the power receiving coil 6 is "0", the polarity of the coils 61 to 63 and connection between the coils become the state as shown in (1) of FIG. 13. Additionally, for explanatory convenience, the unit of the voltage shown in FIG. 13 is 5V (volts) per one cell.

When the power receiving coil 6 faces the power transmitting coil 5, the positional deviation of the power receiving coil 6 becomes "0" (which corresponds to the state (1) in FIG. 13). In such the case, the reception voltages (A, B, and C) of the coils 61 to 63 are 15V, 0V, and −15V respectively. Since the reception voltage of the coil 62 is zero, both terminals of the coil 62 are released.

More, as the reception voltage of the coil 63 is −15V and the polarity of the coil 63 is opposite to the polarity of the coil 61, the polarity of the coil 63 is changed. Also, since the absolute values of the reception voltage of the coil 61 and coil 63 are equal, the coils 61 and coil 63 are connected in parallel as shown in (1) of FIG. 14.

When the positional deviation of the power receiving coil 6 is "x/4" (which corresponds to the state (2) in FIG. 13), the reception voltages (A, B, and C) of the coils 61 to 63 are 10V, 10V, and −10V respectively. Since the polarity of the coil 63 is opposite to the polarity of the coil 61 and coil 62, the polarity of the coil 63 is changed. Also, since the absolute values of the reception voltages from the coil 61 to coil 63 are equal, the coils 61 to 63 are connected in parallel as shown in (2) of FIG. 14.

When the positional deviation of the power receiving coil 6 is "3x/8" (which corresponds to the state (3) in FIG. 13), the reception voltages (A, B, and C) of the coils 61 to 63 are 5V, approximately 14V, and −5V respectively. Since the polarity of the coil 63 is opposite to the polarity of the coil 61 and coil 62, the polarity of the coil 63 is changed. The absolute value of the reception voltage for the coil 62 differs from the absolute values of the reception voltages of the coils 61 and 63, and the absolute values of the reception voltages of the coils 61 and 63 are equal. Accordingly, as shown in (3) of FIG. 14, the coil 61 and coil 63 are connected in parallel and the parallel circuit of the coils 61 and 63 and the coil 62 are connected in series.

Since the magnetic flux ($\phi$) is a multiplication value ($\phi = L \times I$) of inductance (L) of a coil and current that flows through the coil (I), the energy (E) that accumulates to the coil is $E = 1/2 \cdot L \cdot I^2$. According to this formula, to increase the energy (E) that accumulates to the coil, the current (I) that flows through the coil should be large. Thus, in the present embodiment, by connecting the coils having the equal absolute values of the reception voltages in parallel, the current that flows through the coils connected in parallel is made larger. Then, a circuit parameter of a capacity or the like included in the resonant circuit 9 is adjusted so as to match the impedance between the power receiving coil 6 and the load 11, a larger energy accumulated to the power receiving coil 6 is supplied to the load 11 with small loss, thus the electric power extracted at the load 11 becomes higher.

Next, control of the controller 12 is explained. Control for detecting reception voltage of each of the coils 61 to 63 using the voltage sensor 7 and control for determining polarity of the coils 61 to 63 on the basis of the detected voltages are the same as the first embodiment. Thus, their explanations are omitted. Also, control to switch the terminal connections of the coils 61 to 63 between a forward direction, backward direction, or release in accordance with the detected voltages of the coils 61 to 63 is the same as the first embodiment that its explanation is omitted.

After determining the connection state of the terminals for the coils 61 to 63 in accordance with the detected voltage of the coils 61 to 63, the controller 12 calculates the absolute values of the detected voltages of the coils 61 to 63 and compares the absolute values. Then, among the coils 61 to 63, coils having the same absolute values of the detected voltage are determined. The controller 12 controls the switching circuit 8 so as to connect the coils 61 to 63 having the same absolute values of the detected voltage in parallel. Also, the controller 12 controls the switching circuit 8 so as to connect the coils having different absolute values of the detected voltage in series. More, the controller 12 controls the switching circuit 8 so as to release the terminals of a coil of which absolute value of the detected voltage is zero.

Third Embodiment

A non-contact power feeding apparatus according to another embodiment of the present invention is explained. The present embodiment differs from the first embodiment described above in the point that the power transmitting coil 5 is formed with a solenoid-type coil. Other configurations are the same as the first embodiment described above and the descriptions in the first and second embodiments are referenced as required.

A power transmitting coil 5 is a solenoid-type coil. The power transmitting coil 5 is disposed to the ground side and the coil axis of the power transmitting coil 5 is arranged in parallel with the travel direction of a vehicle. The length of the power transmitting coil 5 in the direction along the coil axis is the same as the length of the power receiving coil 6 in the direction along the coil axis. The power transmitting coil 5 is not divided into multiple coils as in the power receiving coil 6 and formed from one coil.

Figure 15:
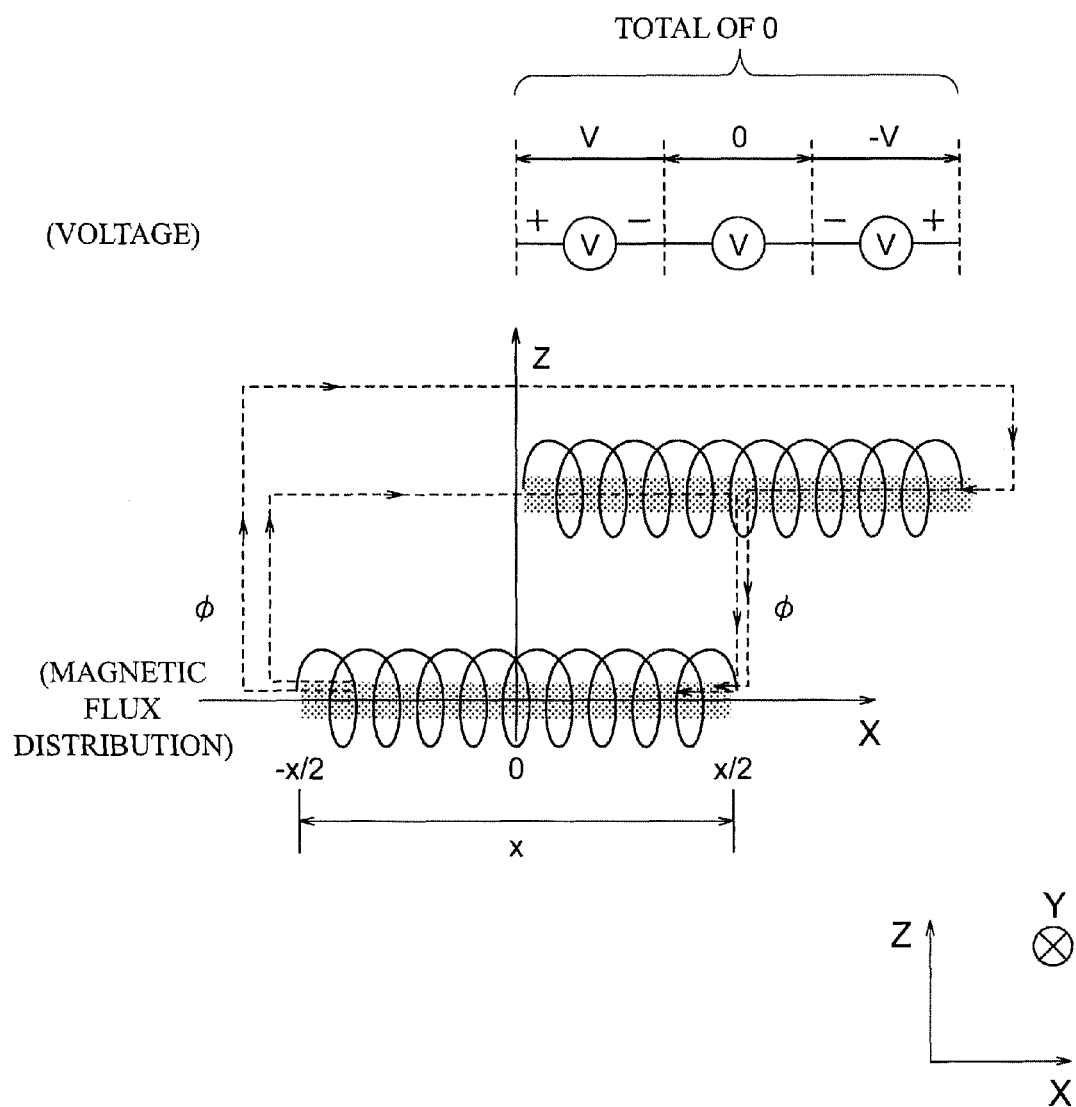
FIG. 15 is conceptual diagrams for explaining a magnetic flux distribution (φ) and the reception voltage between coils of a non-contact power feeding apparatus according to the comparative example.

Next, the voltage (reception voltage) of the power-receiving side is explained for a case (comparative example). In the comparative example, a coil on the power-transmitting side is formed by one solenoid-type coil and a coil on the power-receiving side is formed by one solenoid-type coil. FIG. 15 is conceptual diagrams for explaining a magnetic flux distribution ($\phi$) between coils and reception voltage in a non-contact power feeding apparatus according to a comparative example. However, as shown in FIG. 15, assume that the position of the power receiving coil is shifted for the amount of x/2 to the positive direction of the X-axis relative to the position of the power transmitting coil 5. In the comparative example, the coil on the power-receiving side is formed with one solenoid-type coil. Other configurations are the same as the present invention. Additionally, the length of the power receiving coil and power transmitting coil 5 in the X-direction is the length "x".

The magnetic flux generated by electric conduction to the power transmitting coil 5 enters the coil from an end of the power receiving coil at the position X=0 and passes through the coil in the positive direction of the X-axis. Then, the magnetic flux goes out from the center part of the power receiving coil at the position X=x/2 and returns to the power transmitting coil 5. Further, the magnetic flux generated by the electric conduction to the power transmitting coil 5 enters into the coil from an end of the power receiving coil at the position X=x and passes through the coil in the negative direction of the X-axis. Then, the magnetic flux goes out from the center part of the power receiving coil at the position X=x/2 and returns to the power transmitting coil 5.

The relation of the magnetic flux and reception voltage is explained by dividing the power receiving coil into three. The interlinkage magnetic flux of the power receiving coil is orthogonal to the coil axis on the Z-axis at the position X=x/2. Accordingly, in the middle part of the power receiving coil, the magnetic flux (interlinked magnetic flux) becomes zero and the reception voltage becomes zero.

At the end parts of the power receiving coil, the directions of the magnetic flux are opposite in the positive direction and negative direction of the X-axis. For this reason, the reception voltages at the end parts of the power receiving coil are −V and +V. As the power receiving coil as a whole, the reception voltages at the end parts are mutually cancelled, thus the reception voltage in the power receiving coil becomes zero. In other words, when the positional deviation of the power receiving coil is x/2, the non-contact power feeding apparatus according to the comparative example cannot receive the receiving electric power on the secondary side. Further, as the positional deviation of the power receiving coil becomes larger from the positional deviation of X=0 when the power receiving coil faces the power transmitting coil 5, the reception voltage gradually decreases, and the reception voltage becomes zero when the positional deviation of the power receiving coil is "x/2".

Whereas, in the present invention, while forming the power receiving coil 6 with a plurality of coils 61 to 63, the polarity of the coils 61 to 63 is switched according to the interlinkage magnetic flux that passes through each of the coils 61 to 63. In the following, using FIG. 16 and FIG. 17, the principles of improving the receiving electric power by the present embodiment are explained even when the power transmitting coil 5 is formed with a solenoid-type coil.

Figure 16:
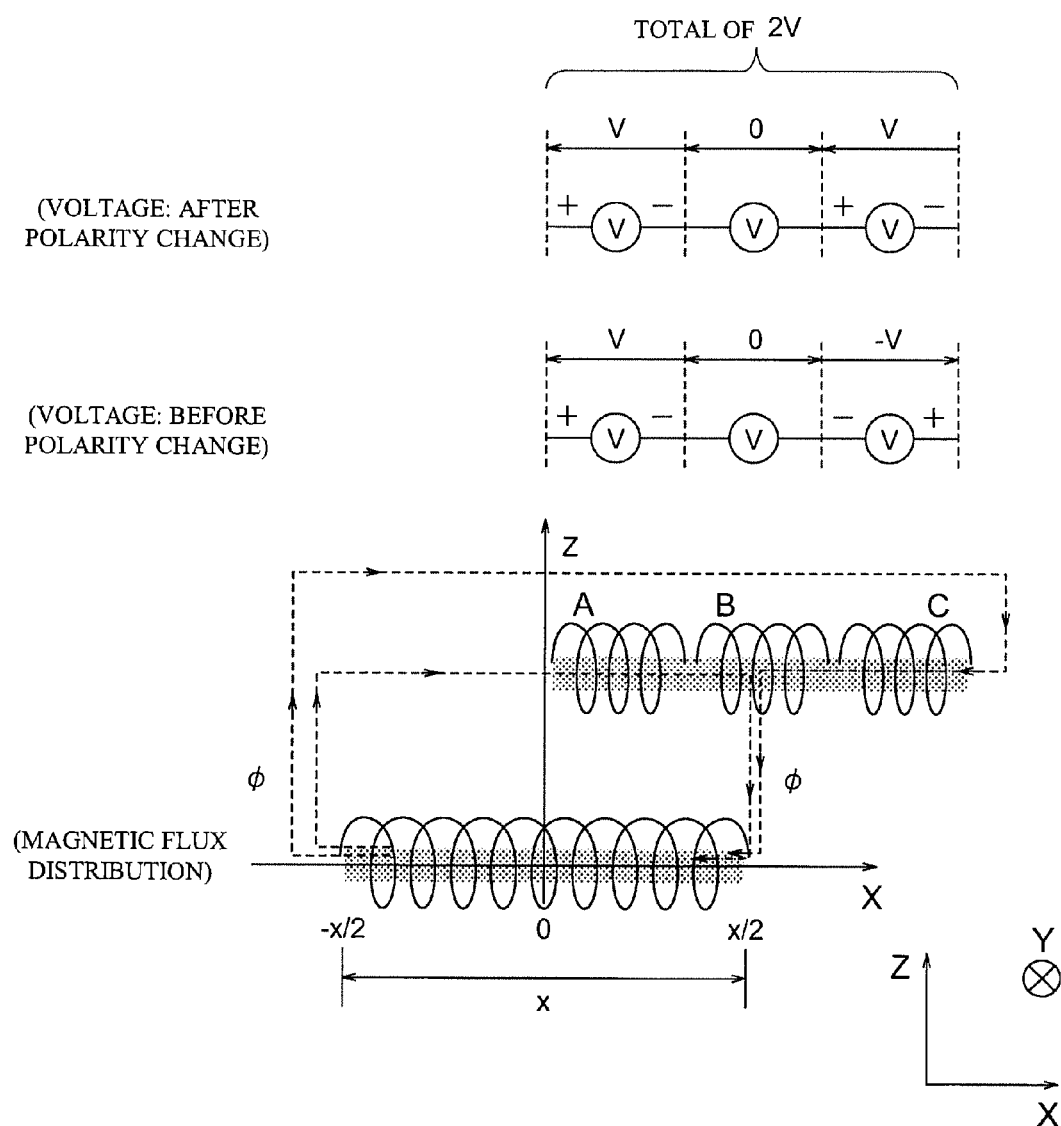
FIG. 16 is conceptual diagrams for explaining a magnetic flux distribution (φ) and the reception voltage between coils of the non-contact power feeding apparatus according to another embodiment of the present invention.
Figure 17:
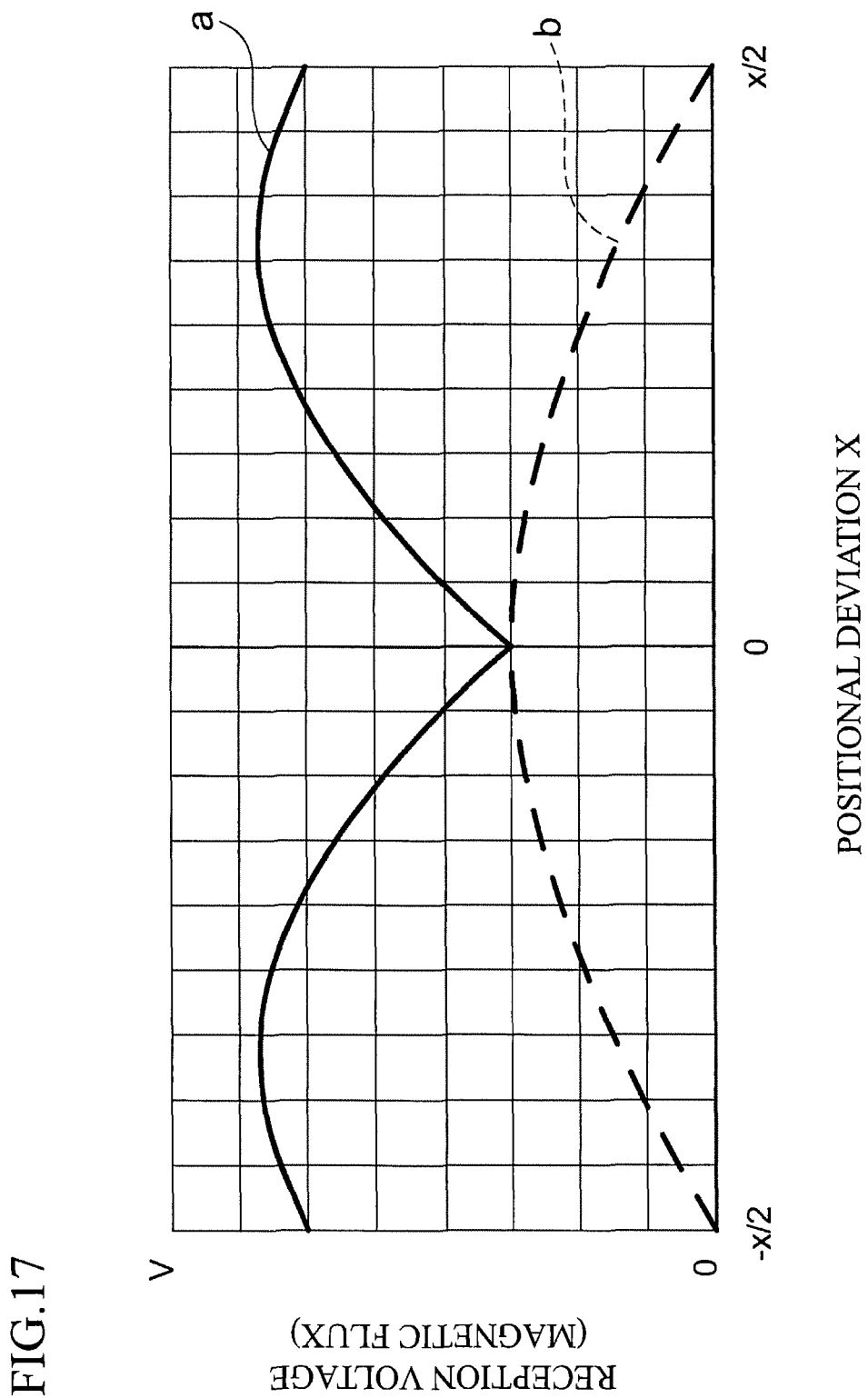
FIG. 17 is a graph illustrating characteristics of the reception voltage relative to a positional deviation of a power receiving coil.

FIG. 16 is conceptual diagrams for explaining a magnetic flux distribution (φ) between coils and the reception voltage. FIG. 17 is a graph illustrating the relation between the positional deviation of the power receiving coil 6 relative to the position of the power transmitting coil 5 and the reception voltage by the power receiving coil 6. Incidentally, in FIG. 16, the indication method of coordinates, the size of the power transmitting coil 5, or the like are the same as in FIG. 15. The graph "a" in FIG. 17 illustrates the characteristic of the present embodiment and the graph "b" illustrates the characteristic of the comparative example.

The direction of the magnetic flux generated by electric conduction to the power transmitting coil 5 is the same as the comparative example. Accordingly, the reception voltage for the coils 61, coil 62 and coil 63 before polarity change of the coil is −V, 0, and +V respectively.

In the present embodiment, since the polarity of the coil 63 is opposite to the polarity of the coil 61, the polarity of the coil 63 is reversed so that the receiving electric power of the coil 61 is changed from −V to +V. In this way, after the polarity change, the reception voltage of the coil 61, coil 62, and coil 63 become +V, 0, and +V respectively. Then, when the coil 61 and coil 63 after the polarity change are connected in series, the receiving electric power of the power receiving coil 6 becomes 2V.

Further, as shown in FIG. 17, when the positional deviation of the power receiving coil is "x/2", although the voltage (reception voltage) of the power receiving coil is zero in the comparative example, the reception voltage is larger than zero in the present embodiment. Also, in the comparative example, the reception voltage gradually decreases as the positional deviation of the power receiving coil increases from X=0. Whereas, in the present invention, even when the positional deviation of the power receiving coil becomes larger than X=0, the reception voltage becomes larger than the reception voltage when the positional deviation is X=0.

As above, in the present embodiment, even when the power transmitting coil 5 is formed by a solenoid-type coil, the reception voltage can be improved as in the first embodiment.

Additionally, as a non-contact power feeding apparatus according to another comparative example, there may be a case in which the power transmitting coil is formed by a plurality of coils. However, as described in the following, even when the power transmitting coil alone is formed by the plurality of coils, the reception voltage cannot be improved as in the present embodiment.

Assume that, in another comparative example, the coil on the power-transmitting side is formed by three coils (disk type) and the coil on the power-receiving side is formed by one disk-type coil. The shape of a single coil is the same between the power-transmitting side and the power-receiving side. The coils on the power-transmitting side are aligned adjacent to each other along the X-axis and the X-directional length of one coil on the power-receiving side is assumed to be the same as the X-directional length (x/2) of the coil on the power-transmitting side. The Y-directional length of the coil is the same for the power-transmitting side and the power-receiving side. Further, in another example, only the coil on the power-transmitting side which overlaps with the coil on the power-receiving side when viewed from the Z-axis direction is electrically conducted. Moreover, coil characteristics, such as a direction of the wound wire of the coil is the same for the power-transmitting side and power-receiving side.

Figure 18:
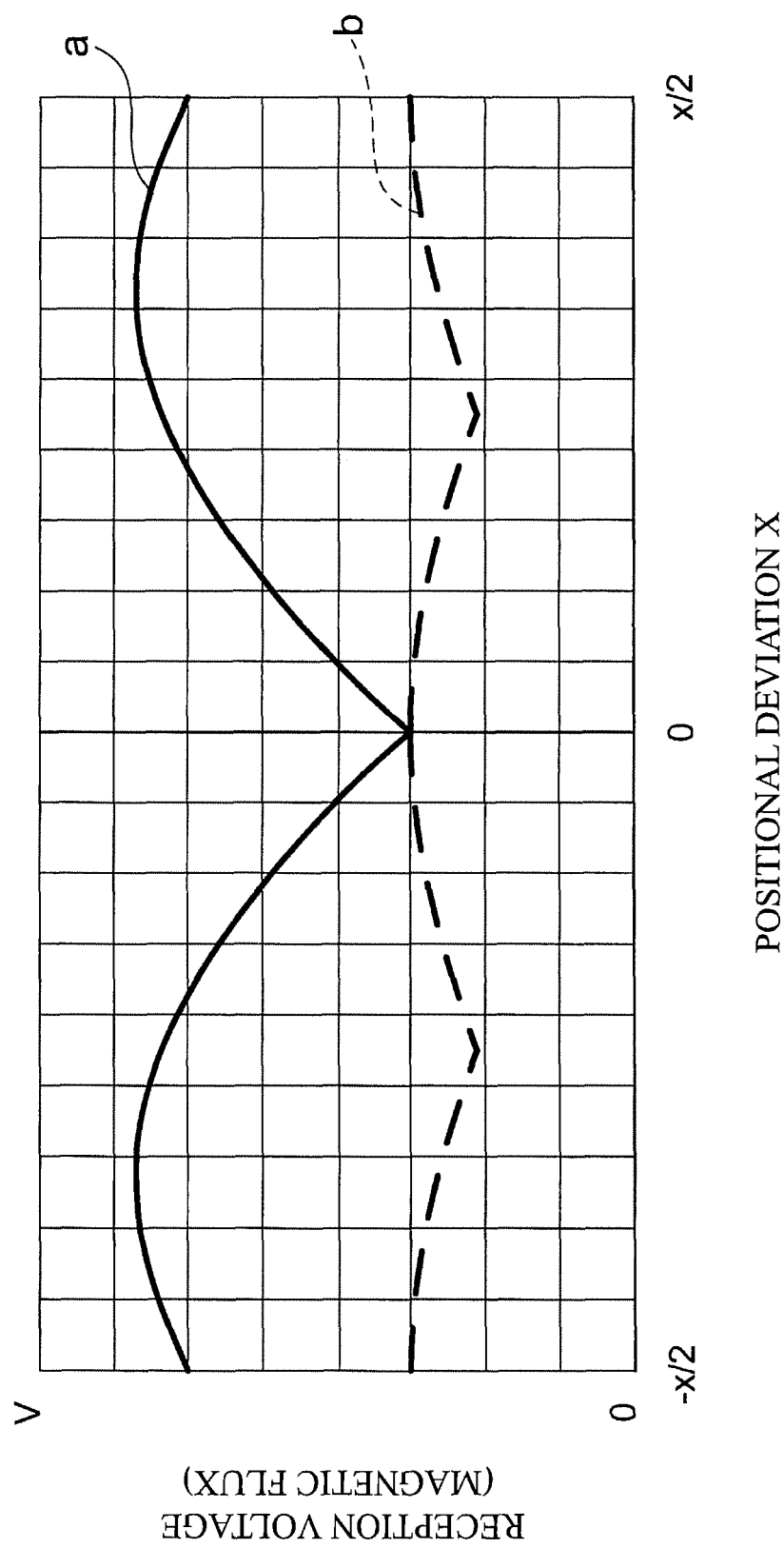
FIG. 18 is a graph illustrating characteristics of the reception voltage relative to the positional deviation of the power receiving coil.

FIG. 18 illustrates characteristics of the reception voltage relative to a positional deviation of the power receiving coil 6. In FIG. 18, the graph "a" illustrates the characteristic of the present embodiment and the graph "b" illustrates the characteristic of another comparative example. As shown in the graph "b", in another comparative example, the receiving electric power becomes the maximum when the coil on the power-receiving side faces one coil on the power-transmitting side. In other words, in another comparative example, the coil on the power-receiving side can receive only the magnetic flux generated in a coil having the length of x/2, which corresponds to one coil on the power-transmitting side, thus, the reception voltage decreases. On the other hand, in the present embodiment, even when the power receiving coil 6 receives a magnetic flux generated by the coil having the length of X=x, since the polarity of the coils 61 to 63 is switched so as not to cancel their reception voltage, the reception voltage accumulates and the reception voltage can be improved (see the graph "a").

DESCRIPTION OF REFERENCE NUMERALS

1 AC power supply
2 Rectifier circuit
3 Inverter
4 Resonant circuit
5 Power transmitting coil
6 Power receiving coil
7 Voltage sensor
8 Switching circuit
9 Resonant circuit
10 Rectifier circuit
11 Load

What is claimed is:

1. A non-contact power feeding apparatus comprising:
a plurality of power receiving coils that receives the electric power transmitted in a non-contacting manner from a power transmitting coil;
a switching unit that switches connection with the plurality of power receiving coil;
a sensor connected to the plurality of power receiving coils and for detecting voltage induced in each of the plurality of power receiving coils;
an output unit that outputs electric power received from the power receiving coil to a load through the switching unit; and
a controller that controls the switching unit, wherein
the switching unit is:
connected to the plurality of power receiving coils;
a circuit for switching among forward-directional connection in which terminals of the power receiving coil are connected to a forward direction, backward-directional connection in which the terminals of the power receiving coil are connected to a backward direction, and a released state in which the terminals of the power receiving coil are released; and
a circuit for switching polarity of the plurality of power receiving coil;
the controller sets the connection with the power receiving coil to the released state when the voltage detected is zero.

2. The non-contact power feeding apparatus according to claim 1,
wherein the controller determines the polarity based on the voltage detected and controls the switching unit in accordance with the polarity determined.

3. The non-contact power feeding apparatus according to claim 2,
wherein the controller sets:
the connection with the power receiving coil to the forward-directional connection when the voltage detected is positive; and
the connection with the power receiving coil to the backward-directional connection when the voltage detected is negative.

4. The non-contact power feeding apparatus according to claim 3,
wherein the switching unit connects:
the plurality of power receiving coils of which an absolute value of the voltage detected is the same in parallel; and
the plurality of power receiving coils of which the absolute value of the voltage detected is different in series.

5. The non-contact power feeding apparatus according to claim 3,
wherein the switching unit connects the power receiving coil connected in the forward-directional connection and the power receiving coil connected in the backward-directional connection in series.

* * * * *